US008904050B1

United States Patent
Raizen et al.

(10) Patent No.: US 8,904,050 B1
(45) Date of Patent: Dec. 2, 2014

(54) TECHNIQUES FOR AUTOMATED DATA STORAGE SYSTEM PORT INITIALIZATION

(71) Applicant: EMC Corporation, Hopkinton, MA (US)

(72) Inventors: Helen S. Raizen, Jamaica Plain, MA (US); David L. Black, Acton, MA (US); Michael J. Scharland, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/798,237

(22) Filed: Mar. 13, 2013

(51) Int. Cl.
*G06F 3/00* (2006.01)
*H04L 12/66* (2006.01)
*G06F 3/06* (2006.01)

(52) U.S. Cl.
CPC .................................. *G06F 3/0635* (2013.01)
USPC ........................................... 710/10; 370/463

(58) Field of Classification Search
CPC ... H04L 67/1097; G06F 3/0653; G06F 3/067; G06F 3/0689
See application file for complete search history.

(56) References Cited

U.S. PATENT DOCUMENTS

| 2006/0165116 | A1* | 7/2006 | Bayus et al. | 370/463 |
| 2008/0005553 | A1* | 1/2008 | Wang | 713/2 |
| 2011/0125964 | A1* | 5/2011 | Fujibayashi et al. | 711/114 |
| 2013/0196658 | A1* | 8/2013 | Fedor et al. | 455/434 |
| 2014/0025537 | A1* | 1/2014 | Venkataramu et al. | 705/26.61 |

* cited by examiner

*Primary Examiner* — Hyun Nam
(74) *Attorney, Agent, or Firm* — Muirhead and Saturnelli, LLC

(57) ABSTRACT

Described are techniques for automatically configuring target port settings. A set of target port settings of a target port of a data storage system is initialized in accordance with a first target port setting configuration. It is determined whether the data storage system supports host registration. If the data storage system supports host registration, first processing is performed that includes registering a first host with the data storage system, wherein registering includes sending first information from the first host to the data storage system, the first information being sent from an initiator port of the first host to the target port; determining, using the first information, whether the set of target port settings of the target port require modification for use by the first host; and modifying the set of target port settings in accordance with the first information if the set of target port settings require modification.

19 Claims, 16 Drawing Sheets

| bit→<br>↓byte | 7 | 6 | 5 | 4 | 3 | 2 | 1 | 0 |
|---|---|---|---|---|---|---|---|---|
| 0 | Command code = EFh (AAQ command) 1003 ||||||||
| 1 | LUN (ignored) 1004 ||| Reserved 1006 |||||
| 2 | Database ID 1008 ||||||||
| 3 | Operational Qualifier 1010 ||||||||
| 4-5 | Key 1012 ||||||||
| 6-8 | Buffer Length 1014 ||||||||
| 9 | Control Byte 1016 ||||||||

AAQ command 1002

| bit→<br>↓byte | 7 | 6 | 5 | 4 | 3 | 2 | 1 | 0 |
|---|---|---|---|---|---|---|---|---|
| 0 | Command code = EEh (AAS command) 1203 ||||||||
| 1 | LUN 1204 | | | Reserved 1206 |||||
| 2 | Database ID 1208 (identifies initiator object type) ||||||||
| 3 | Operational Qualifier 1210 ||||||||
| 4-5 | Reserved 1212 ||||||||
| 6-8 | Payload buffer Length 1214 ||||||||
| 9 | Control Byte 1216 ||||||||

AAS command 1202

TECHNIQUES FOR AUTOMATED DATA STORAGE SYSTEM PORT INITIALIZATION

BACKGROUND

1. Technical Field

This application generally relates to data storage systems, and more particularly to techniques used for communicating with data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

An application may execute on a host where the application performs I/O (input/output) operations. The host may be able to transmit the data operation to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

In accordance with one aspect of the invention is a method of automatically configuring target port settings comprising: initializing a set of target port settings of a target port of a data storage system in accordance with a first target port setting configuration; determining whether the data storage system supports host registration; if said data storage system supports host registration, performing first processing including: registering a first host with the data storage system, wherein said registering includes sending first information from the first host to the data storage system, said first information being sent from an initiator port of the first host to the target port; determining, using the first information, whether the set of target port settings of the target port require modification for use by the first host; and modifying the set of target port settings in accordance with the first information if it is determined that the set of target port settings require modification. The first information may include identifying information identifying one or more aspects of the first host affecting target port setting settings. The identifying information may include information related to any of host operating system, host hardware, initiator port hardware, initiator port firmware, additional host software besides host operating system, and software included in a runtime I/O stack used in connection with sending I/Os from the first host to the data storage system. The first processing may further include notifying the first host as to whether the set of target port settings of the target port requires modification and thereby indicating to the first host that performing discovery processing and registering the first host with the data storage system is needed; and responsive to the first host receiving notification that the set of target port settings of the target port require modification, triggering the first host to perform second processing including discovery processing and reregistering the first host with the data storage system, wherein said reregistering includes the data storage system notifying the first host that no modifications to the set of target port settings is needed. The step of determining whether the data storage system supports host registration may include sending a query command from the initiator port to the target port and receiving a first response from the data storage system indicating whether host registration is supported. If the first response indicates host registration on the data storage system is supported, the first response may include information identifying one or more host registration versions that are supported. Registering the first host with the data storage system may include registering the first host on a plurality of paths between the first host and the data storage system with respect to one or more storage devices exposed to the first host over the plurality of paths. The data storage system may perform target port setting modifications in accordance with a scoping target port setting configuration option. A first set of target port settings of a first target port of the data storage system may be used in connection with commands received at the first target port, and the scoping target port setting configuration option may be any of: the first set of target port settings of the first target port is used in connection with commands received at the first target port for a single initiator and a single storage device exposed through the first target port, the first set of target port settings of the first target port is used in connection with commands received at the first target port for a single initiator and all storage devices exposed through the first target port, the first set of target port settings of the first target port is used in connection with commands received at the first target port for a plurality of initiator ports and a single storage device exposed through the first target port, the first set of target port settings of the first target port is used in connection with commands received at the first target port for a plurality of initiator ports and all storage devices exposed through the first target port, the first set of target port settings of the first target port is used in connection with commands received at a plurality of target ports of the data storage system for a plurality of initiator ports and a single storage device exposed through the first target port, the first set of target port settings of the first target port is used in connection with commands received at a plurality of target ports of the data storage system for a plurality of initiator ports and all storage devices of the data storage system, and the first set of target port settings of the first target port is used in connection with commands received at a plurality of target ports of the data storage system for a plurality of initiator ports and all storage devices exposed through the first target port. The second processing may be triggered by any of: a call by a driver of the first host into an operating system of the first host, a driver executing in kernel space invoking a process executing in user space whereby the process performs an operating system call, a management command, and a notification received by the host from the data storage system whereby the notification results in an operating system of the first host performing the second processing and wherein the notification is sent to the first host in response to a command sent to the data storage system. The identifying information may be sent from the first host to the data storage system in a setup command. Registering the first host may include sending the identifying information in a setup command over a plurality of paths between the first host and the data storage system. Registering the first host may include sending a plurality of setup commands from the host to the data storage system, each of the plurality of setup commands corresponding to a unique combination of an initiator port of the first host, a target port of the data storage system, and a storage device exposed through the target port. The first host may include a driver. The driver may perform second processing including: sending a query command from the initiator port of the first host to target port of the data storage system; receiving a first response from the data storage system indicating that host registration is supported; responsive to receiving the first response, sending a setup command including the first information from the initiator port to the target port; receiving a second response from the data storage system indicating that the set of target port settings require modification; and performing processing to trigger an operating system of the first host to perform third processing including discovery processing and reregistering the first host with the data storage system, wherein said reregistering includes the data storage system notifying the first host that no modifications to the set of target port settings is needed. When the first host issues an I/O operation to the data storage system, the driver may be included in a runtime I/O stack of the first host used in connection with issuing the I/O operation to the data storage system. The runtime I/O stack may include a plurality of software layers comprising an application layer, a file system and the driver below the file system in the runtime I/O stack. The set of target port settings may include one or more flags affecting any of the target port, the data storage system, processing performed by the data storage system in connection with a received command at the target port, target port firmware code execution, target port hardware settings, processing performed in response to an error occurring during execution of a command received at the target port, and behavior of the data storage system in response to conditions arising on the data storage system. Responsive to modifying the set of target port settings, one or more conditions may be established on the data storage system indicating that the data storage system needs to send a notification to the first host. The method may also include sending a command from the host to the data storage system; responsive to receiving the command at the data storage system, sending a message from the data storage system to the host regarding one of the conditions established on the data storage system, wherein the data storage systems clears any remaining ones of said one or more conditions for first host; and responsive to the host receiving the message regarding the one condition, performing second processing including discovery processing and reregistering the first host with the data storage system, wherein said reregistering includes the data storage system notifying the first host that no modifications to the set of target port settings is needed.

In accordance with another aspect of the invention is a computer readable medium comprising code stored thereon for automatically configuring target port settings, the computer readable medium comprising code for: initializing a set of target port settings of a target port of a data storage system in accordance with a first target port setting configuration; determining whether the data storage system supports host registration; if said data storage system supports host registration, performing first processing including: registering a first host with the data storage system, wherein said registering includes sending first information from the first host to the data storage system, said first information being sent from an initiator port of the first host to the target port; determining, using the first information, whether the set of target port settings of the target port require modification for use by the first host; and modifying the set of target port settings in accordance with the first information if it is determined that the set of target port settings require modification.

In accordance with another aspect of the invention is a system comprising: a data storage system including a target port having a set of target port settings, the data storage system comprising a first memory including code stored therein for: initializing a set of target port settings of a target port of a data storage system in accordance with a first target port setting configuration; a host including an initiator port and a second memory including code stored therein for: determining whether the data storage system supports host registration; performing first processing if said data storage system supports host registration, said first processing including: registering the host with the data storage system, wherein said registering includes sending first information from the host to the data storage system, said first information being sent from the initiator port of the host to the target port; and wherein the first memory of the data storage system further comprising code stored therein for: determining, using the first information, whether the set of target port settings of the target port require modification for use by the host; and modifying the set of target port settings in accordance with the first information if it is determined that the set of target port settings require modification.

BRIEF DESCRIPTION OF THE DRAWINGS

Features and advantages of the present invention will become more apparent from the following detailed description of exemplary embodiments thereof taken in conjunction with the accompanying drawings in which:

FIGS. 13, 14 and 15 are examples of various structures that may be used in an embodiment in accordance with techniques herein.

DETAILED DESCRIPTION OF EMBODIMENT(S)

Figure 1:
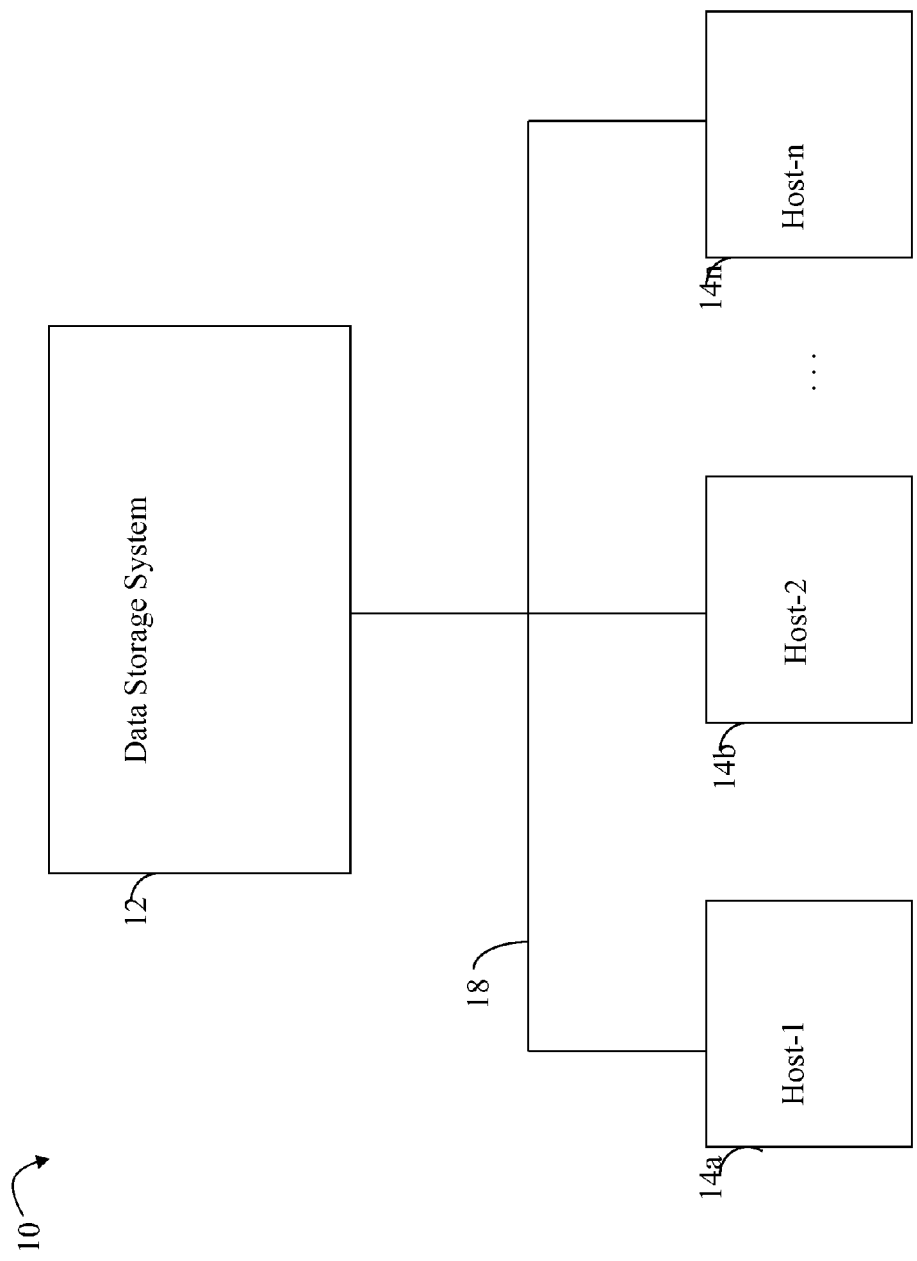
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
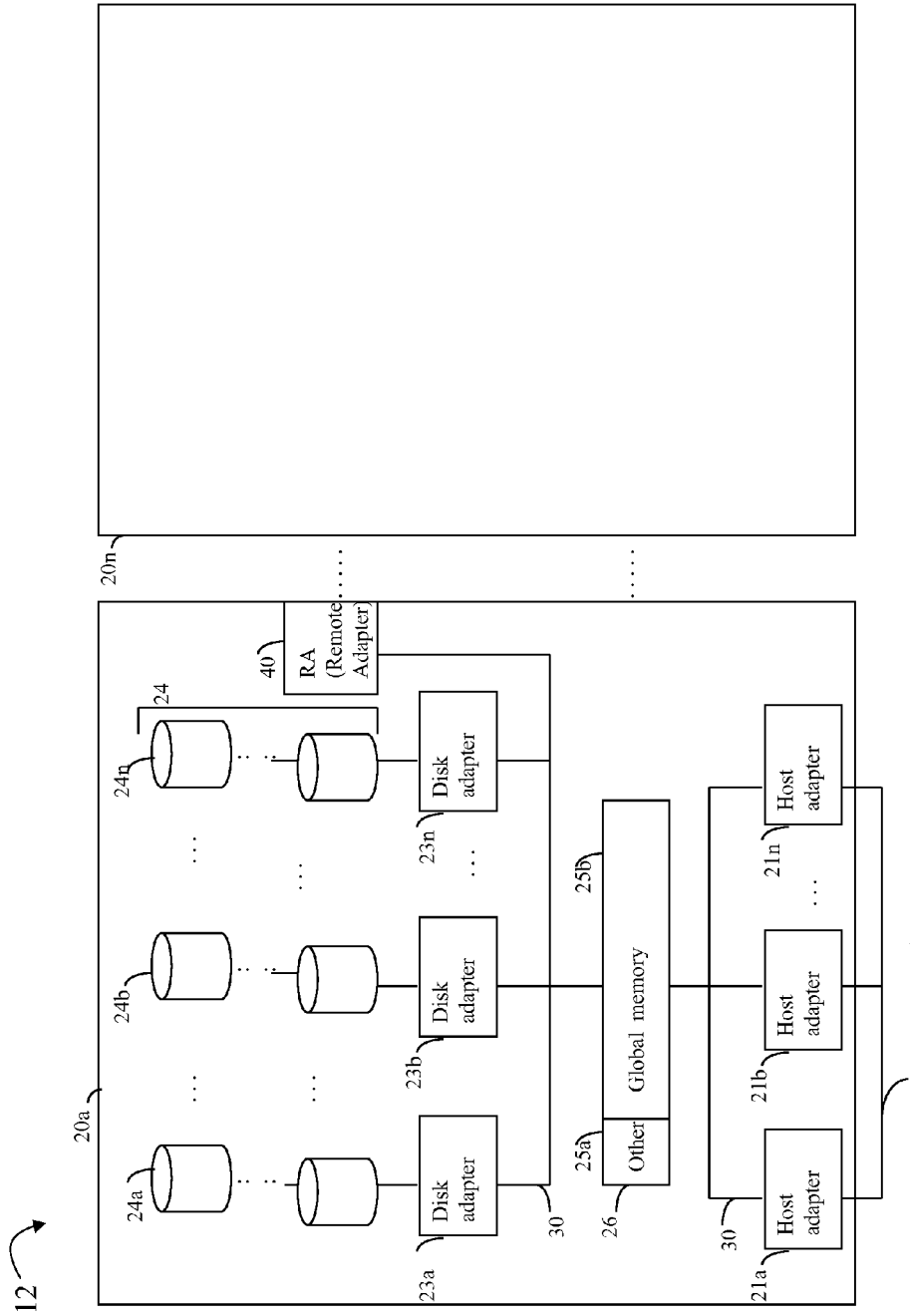
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA performs I/O operations on a disk drive. Data residing on a disk drive may be accessed by the DA following a data request in connection with I/O operations that other directors originate.

Figure 2B:
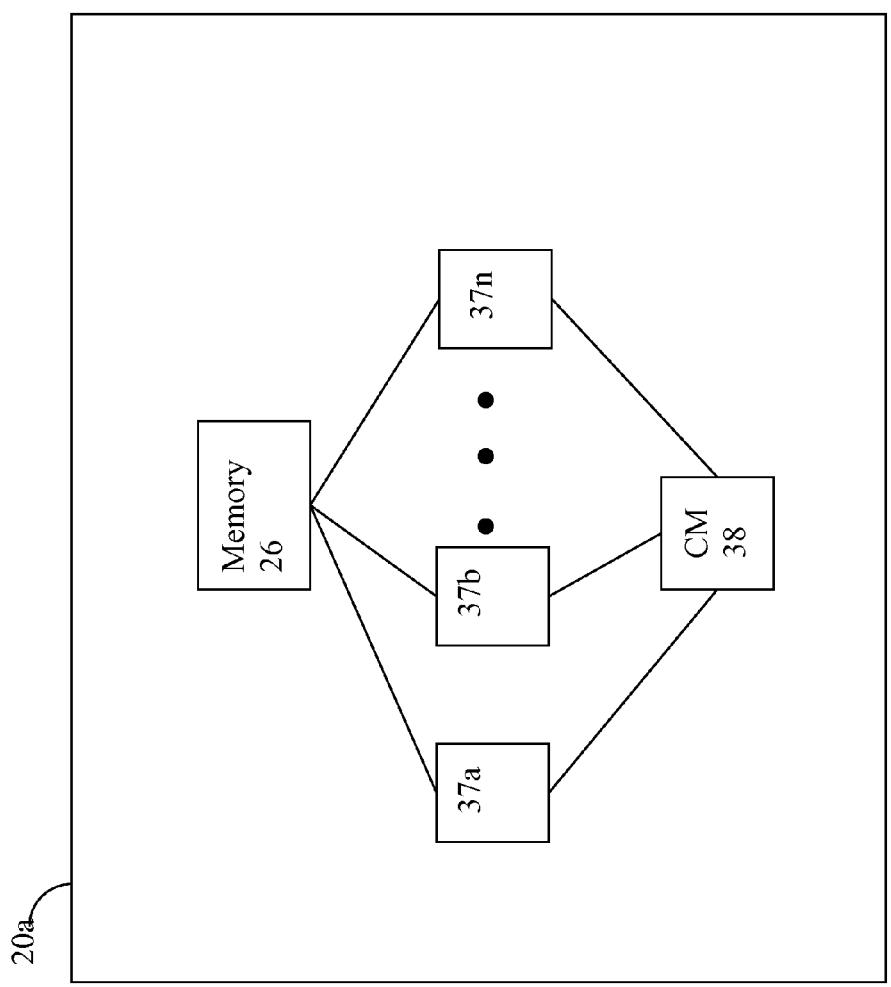
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system.

Figure 3:
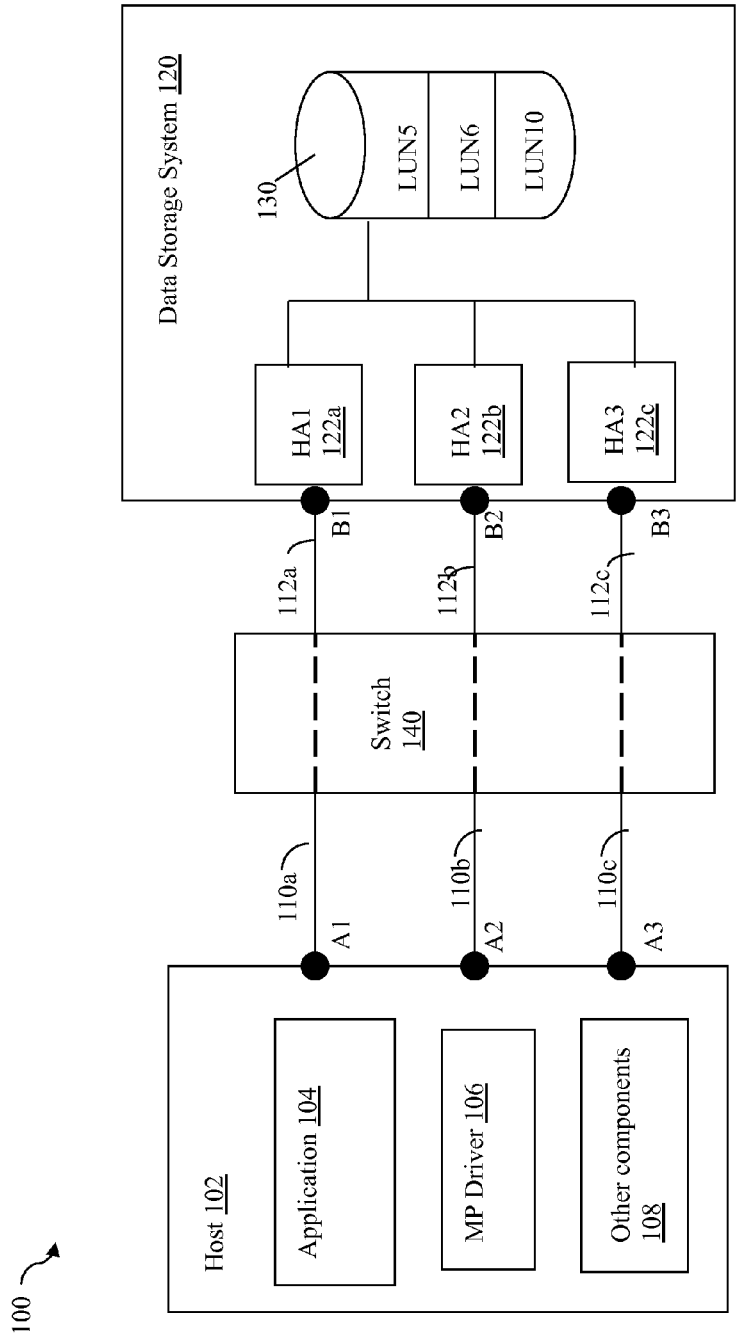
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The MP driver 106 may be included a commercially available product such as, for example, EMC®, PowerPath® software by EMC Corporation. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC or SCSI driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine which of the multiple paths are active or available at a point in time, which of the multiple paths are unavailable for communications, and to use such information to select a path for host-data storage system communications.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a port of an HA of the data storage system 120. Each of the LUNs of the device 130 may be accessible over three paths—a first path represented by A1-B1, a second path represented by A2-B2 and a third path represented by A3-B3.

Although the techniques herein may be used in an embodiment in which the driver resides on a host and manages data storage devices on a data storage system, the driver may also manage data storage devices that are directly attached to the host.

Figure 4:
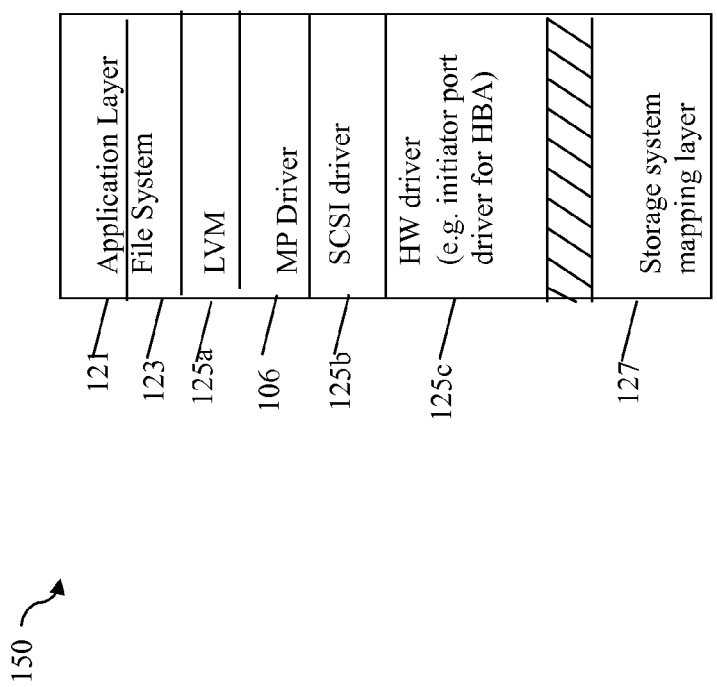
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3. The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as EMC®, PowerPath® software. Functionality for performing multipathing operations such as may be performed by EMC® PowerPath® software may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI driver 125b and a hardware (HW) driver 125c. The SCSI driver 125b may handle processing of a received I/O request from the MP driver 106 such as related to forming a request in accordance with the SCSI standard. The driver 125c may be a HW driver that facilitates communication with hardware on the host. The driver 125c may be, for example, a driver for an HBA of the host which sends commands or requests to the data storage system and also receives responses and other communications from the data storage system.

It should be noted that an embodiment may also include mapping layers as in FIG. 4 with a variation that the ordering of the MP driver 106 and SCSI driver 125b may be reversed.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may executed in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, and the like. Additionally, the host may provide a virtualized environment and may execute, for example, VMware ESX or VMware ESXi software providing bare metal embedded hypervisors.

In operation, an application executing at application layer 121 may issue one or more I/O operations (e.g., read and write operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a.

In connection with an embodiment in accordance with techniques herein, communications between an initiator port of the host and a target port of a data storage system may include those related to I/O operations and other non-I/O commands such as related to host control operations. I/O operations may include, for example, read and write operations. Host control operations may include those commands which are not performing I/O with respect to a data storage device (e.g., LUN) and include SCSI command such as, for example, INQUIRY, MODE SENSE (10), READ CAPACITY (16), and the like, which may be issued by the host in connection with discovery and configuration processing such as when the host is booting or coming online.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

Some data storage system may require specific settings on the target ports (e.g., ports of the HA of the data storage system at which commands from the host are received such as denoted by B1-B3 of FIG. 3) in order to provide appropriate behavior based on the particular operating system platform where the initiator resides. These specific settings of the target port have traditionally been set manually such as by a field service engineer which is time consuming and costly. In some embodiments, some or all of the target port settings may be implemented using flags (e.g., referred to elsewhere herein as target port flags) whereby each flag may be a bit encoding of one of the target port settings. Following paragraphs may make reference to target port flags as an example of the more general target port settings. Thus, although target port flags may be used in following paragraphs and description to illustrate use of techniques herein, more generally, target port flags refer to target port settings. Techniques described herein may be used, more generally, in connection with target port settings and are not limited to cases where such settings are implemented using bit flags.

In following paragraphs, techniques are described that may be used in connection with providing an automated cooperating mechanism between a host-based I/O driver, such as the MP driver 106, and a data storage system, such as a Symmetrix® VMAX® data storage system by EMC Corporation, to configure settings of the target port for the particular operating system configuration of the host including an initiator port. Although processing for performing techniques described herein in following examples may be included in the MP driver 106, such processing may be, more generally, performed by any suitable driver on the host. For example, with reference to FIG. 4, such processing in accordance with techniques herein may be generally performed by any driver of the host included in the I/O stack at or below the MP driver 106. Also, examples herein may refer to SCSI-based communication and commands. However, those skilled in the art will appreciate that techniques herein may be more generally used with any suitable protocol, standard, commands, and the like.

Initially, a data storage system may be configured for use by one or more hosts. Part of this configuration processing includes defining what LUNs of the data storage system are accessible or visible to the host over which one or more paths. Discovery processing may then be performed by the host to discover or scan for all LUNs accessible to the host and over what one or more paths. As part of discovery processing, the host may issue commands to the data storage system to discover what LUNs are visible to the host over what one or more paths, discover information about each LUN, and the like. SCSI behavior dependencies such as those that may vary with target port flag settings may not apply in connection with some commands sent from the host to the data storage system early in the host boot sequence such as in connection with discovery and configuration processing. For example, SCSI behavioral dependencies that may vary with the target port flag settings may affect I/O command processing but may not apply to other control or non-I/O commands which may be issued earlier in the host boot sequence, such as in connection with discovery and configuration processing, prior to issuing I/Os from upper layers such as above the MP driver 106. As the host is coming online and/or performing processing such as related to discovery and configuration processing, techniques herein provide for automated configuration and setting of target port flags through the use of an initial exchange of commands between the host and data storage system. This initial exchange of commands may be performed prior to issuance of host I/O commands which require that the particular target port flags be appropriately set since such correct target port flag settings affect processing performed by the data storage system for the I/O commands. Examples of such an initial exchange of commands are described in more detail below. Generally, such an exchange may be performed in connection with processing in accordance with techniques herein to facilitate communicating to the data storage system aspects of the host (e.g., such as related to the host operating system, so the data storage system may automatically configure the target port including appropriately setting the target port flags to ensure proper processing and behavior for all commands, including I/O commands, sent from the host to the target port.

As described herein, the target port flag settings may be configured and may vary with the operating system of the host whereby the host includes the initiator communicating with the target port of the data storage system. More generally, such target port flag settings may be configured and may vary with the host operating system and/or other aspects of the host including the initiator. For example, the target port flag settings affecting data storage system processing for I/O commands may be configured and vary with any one or more of the host operating system, hardware of the host, I/O hardware, such as the HBA, including the initiator port, and additional host software. The additional host software may generally include other software on the host (e.g., in the I/O stack) besides the operating system that may be dependent on one or more of the target port flag settings when issuing I/O commands.

Techniques herein may be used in an embodiment whereby, as part of discovery and configuration processing, the host-side driver performing processing in accordance with techniques herein performs host registration. Host registration may be characterized as a process by which the host tells the data storage system about itself, which may include aspects such as operating system name and version, as well as possibly other aspects that may affect target port flag settings. Once such information about the host is communicated to the data storage system, the data storage system may select the correct flag settings for that host and automatically implement them. In other words, a target port's flags may have settings which result in data storage system behavior and processing, such as in connection with received commands, in accordance with requirements and/or expectations of the host including the initiator port from which such commands are sent. Code executing on the data storage system may select suitable flag settings stored on the data storage system such as in a table providing suitable target port settings for the different possible varying host aspects such as operating system. In one aspect, the techniques herein solve a "chicken and egg problem" whereby the target port flags must be set before the host can pass down the information about the operating system but the data storage system does not know how to set the flags without that information. Additionally, if the target port flag settings are modified, the host needs to be notified in order to perform a rescan or rediscovery since information the host has acquired prior to the modification is no longer valid.

As described in following paragraphs, processing performed may be characterized as a two-phase process. In phase one (1), the target port flags may be configured in a generic fashion sufficient to support non-I/O or control commands such as the SCSI INQUIRY command coming from the host as well as data storage-specific or vendor-specific commands, such as the AAQ (advanced array query) command and the AAS (advanced array setup) commands. The AAQ command may be generally described as a query command sent from the host to the data storage system. With the query command, the host requests or queries the data storage system for particular information about the data storage system, and the data storage system returns information in accordance with the particular requested information specified in the query command. The AAS command may be generally described as a setup command sent from the host to the data storage system whereby the host provides the data storage system with one or more items of information identifying various aspects of the host. Such identifying information of the host may be generally any information used by the data storage system to appropriately configure and set target port flags in accordance with techniques herein. As mentioned elsewhere herein, although such identifying information for purposes of illustration may relate, for example, to the host operating system, the identifying information may also include other identifying information such as related to other aspects of the host (e.g., host hardware, initiator hardware and/or additional software besides the operating system on the host).

It should be noted that the AAQ and AAS commands described herein are vendor-specific commands and functionality described herein using such vendor-specific commands may be generally implemented using any suitable commands. For example, the SCSI MODE SENSE (10) command may be used as an alternative to the AAQ command and the MODE SELECT (10) command may be used as an alternative to the AAS command. In such an embodiment, the foregoing commands may use vendor-specific mode pages for host registration.

More detail is described in following paragraphs regarding the AAQ and AAS commands that may be used in an embodiment with techniques herein. However, it should be noted that generally any query command may be sent from the host to the data storage system whereby the data storage system responds with information denoting whether the host registration process is supported and if needed, also provides a particular version number. Also, more generally, any setup or set command may be sent from the host to the data storage system whereby the host communicates to the data storage system identifying information about the host used by the data storage system in setting or modifying any necessary target port flags.

In phase 1, the AAQ command may be sent from the host to the data storage system whereby the data storage system sends a response indicating whether host registration is supported. If host registration is supported, the host then sends an AAS command providing the host-specific information identifying aspects of the host, such as the host operating system and other aspects described herein. In phase 2, the data storage system may appropriately set target port flags for the specific host operating system and, more generally, based on the host identifying information sent to the data storage system in phase 1, and then re-exposing the devices or LUNs with the updated target port flags. On the host side, the host may perform a new scan for paths and LUNs accessible over such paths as part of repeating discovery and configuration processing using the correct flag settings.

Host registration facilitates the data storage system understanding information about each of the one or more initiator ports on the host. Consistent with discussion elsewhere herein, each path between a host and the data storage system in combination with a LUN available over the path may be denoted by a combination of initiator (e.g., initiator port such as of an HBA on the host), target (e.g., target port such as of an HA of the data storage system) and LUN (e.g., whereby the LUN is accessible, visible, or exposed to the initiator through the target) and thus, may also be denoted as a single ITL (for I=initiator, T=target and L=LUN) instance. On each path (e.g., IT) over which a LUN is available (e.g., each ITL) discovered by the MP driver, the driver may communicate and send the host identifying information down each such path for each ITL. Techniques herein use the AAQ and AAS SCSI commands to facilitate automatically sending such host-side identifying information to the data storage system for use by the data storage system in automatically setting target port flags to values suitable and appropriate for use in accordance with the host-side identifying information.

As described in more detail below, phase 2 may be conditionally performed such as with respect to one or more ITLs only if the associated current target port flag settings need to be modified in accordance with the host identifying information as communicated to the data storage system in phase 1. Thus, phase 1 includes determining whether the target port flags are appropriately set for one or more ITLs and phase 2 is conditionally performed if any target port flags require modification.

As a variation to that just described and also set forth in more detail below, an embodiment may implement variations regarding commands exchanged in performing techniques herein. For example, an embodiment may have an AAQ command, or more generally a query command, issued from the host to the data storage system for a particular ITL as described. In response to the AAQ command, the data storage system may return information indicating current target port settings for the target port of that particular ITL. The host may perform processing to determine whether the current target port settings should be modified. If the host determines that the current target port settings do not require modification, the AAS command and processing may be skipped. Alternatively, if the host determines that current target port settings require modification, the AAS command may then be sent with respect to the ITL as described herein. In this manner, the host may alternatively do the work needed to determine whether target port settings require modification whereby the AAS command may be conditionally performed if modification is needed, as determined by the host.

Figure 5:
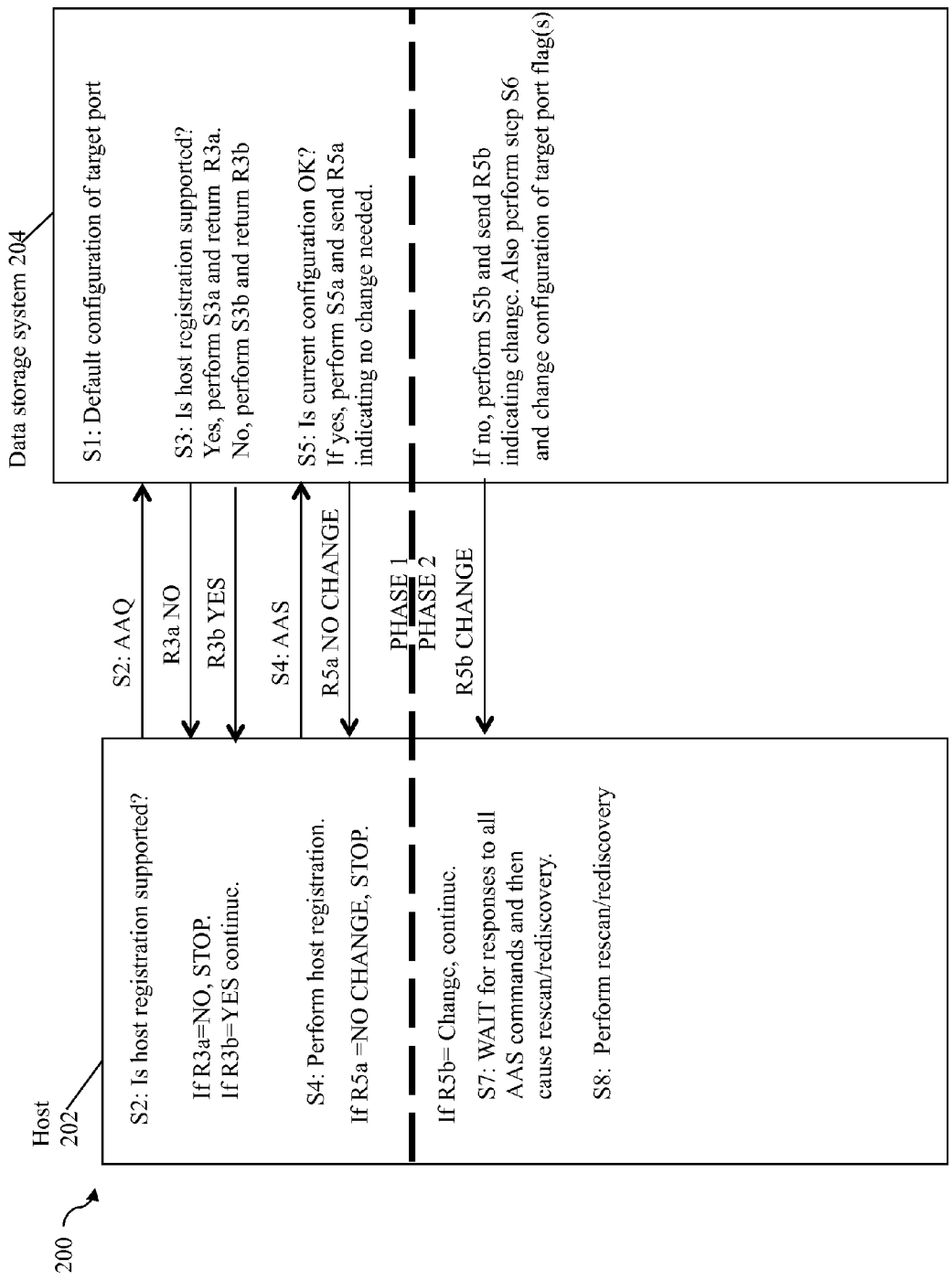
FIGS. 5-6 are examples illustrating commands and associated responses that may be exchanged between a host and a data storage system in an embodiment in accordance with techniques herein.

Referring to FIG. 5, illustrated are processing steps that may be performed in an embodiment in accordance with techniques herein. In a first step S1, the data storage system may configure each of its target ports in accordance with a set of default target port flag settings. Examples of target port flags and associated settings are described in more detail elsewhere herein. The host may, for example, be coming online and performing processing such as for discovery and configuration as described elsewhere herein. The host may discover one or more paths over which one or more LUNs may be exposed to the host. Over each such path for each exposed LUN, the host may perform processing which, for purposes of simplicity, will be described with respect to a single ITL instance although the AAQ and AAS commands described herein may be issued with respect to each ITL of the host. In step S2, the host issues a query command, such as the AAQ command, to the data storage system inquiring whether host registration in supported on the data storage system. The data storage system performs processing in step S3 and returns either response R3a indicating that host registration is not supported on the data storage system 204, or response R3b indicating host registration is supported on the data storage system. Additionally, if host registration is supported, then the data storage system's response R3b may also indicate what one or more versions of host registration is supported by the data storage system. If the response received on the host 202 from the data storage system 204 is R3a indicating that host registration is not supported, no processing for host registration is performed. Processing may continue with subsequent processing as typically performed by the host. If the response received on the host 202 from the data storage system 204 is R3b indicating that host registration is supported, processing for host registration may be performed in a step S4. In step S4, the host sends an AAS or setup command to the data storage system with identifying information about the host such as host operating system, initiator port sending the AAS command, and the like. The AAS command includes identifying information about the host. As described elsewhere herein, such identifying information may indicate information about the host operating system and other aspects of the host, initiator, and the like, as described herein. The identifying information may include information, for example, related to any of host operating system, host hardware, initiator port hardware, initiator port firmware, additional host software besides host operating system, and software included in a runtime I/O stack used in connection with sending I/Os from the first host to the data storage system.

It should be noted that if host registration is not supported, other suitable means may be used to ensure that the target port settings are appropriate for the host and make any necessary modifications.

Some of the identifying information may be used by the data storage system in connection with performing step S5 where a determination is made as to whether any modifications are needed to the current target port flag settings. In other words, the storage system performs step S5 to make a determination as to whether to modify current target port flag settings in accordance with the received identifying information in the AAS command. If step S5 results in a determination by the data storage system that the current target port flag settings do not require modification, S5a is performed where a response R5a is sent from the data storage system 204 to the host 202 thereby indicating that the data storage system is making no changes to the current target port flags for the particular ITL for which the AAS command was sent by the host. R5a may be a response returned having a good status (indicating that the data storage system successfully performed processing for the requested command) and may also include additional data indicating that no configuration change is needed for target port flags for the particular ITL to which the AAS was directed.

It should be noted that R5a indicating NO CHANGE may be returned if no modification is needed to the current target port settings, as just described. As a slight variation, R5a may be returned to indicate to the host that rediscovery or rescan processing is not needed in that either there is no modification needed for current target port settings, or that any modification to current target port settings will not require the host to perform a rescan or rediscovery. An example of such a target port flag is described elsewhere herein whereby even if the target port flag setting is modified, any of the state information that the host may have obtained from the data storage system prior to this point in time is not invalidated due to the modification.

If step S5 results in a determination by the data storage system that the current target port flag settings do require modification, S5b is performed where a response R5b is sent from the data storage system 204 to the host 202 thereby indicating that the data storage system is making one or more changes to the current target port flags for the particular ITL to which the AAS is directed. In connection with the response R5b, the data storage system may return a response status of good with additional data indicating that the data storage system will update the target port flag settings associated with that particular ITL to which the AAS sent in S4 was directed. The data storage system actually performs such suitable modifications to the current target port flag settings in a step S6. It should be noted that the actual modification to the target port flag settings by the data storage system in S6 may occur before the response R5b is sent to the host.

It should be noted that an embodiment may vary the scope or effect of the configuration change made in step S6 to target port flag settings for a single AAS command directed to a single ITL (e.g., where the AAS command is received by the data storage system over a single path for a particular LUN). In other words an embodiment may vary which particular target port settings may be automatically updated in response to a single AAS command received for a single ITL. An embodiment of the data storage system may associate a different instance of target port flags for each ITL combination as well as other variations as described herein that may vary with the selected scope and implementation. In connection with varying configuration scope options for target port flags, sending a single AAS command from a single initiator to a single target where the AAS command is directed to a particular LUN may affect that single ITL as well as possibly other target port flags for other ITLs. The following summarizes some different options regarding the scope of the configuration for the target port flags for a single AAS command received for a single ITL that may be used in an embodiment with techniques herein. Assume for purposes of illustration that an AAS command is sent to a LUN over a path identified by I1-T1-L1. As used herein, I in combination with "*" I (e.g., I*) may denote all initiators of a particular host, T in combination with "*" (e.g., T*) may denote all target ports of the data storage system, and L in combination with "*" (e.g., L*) may denote all LUN instances exposed over all target ports of the data storage system or simply all LUNs of the data storage system (e.g., all LUNs with the scope dependent on I and T). Following are some options regarding the scope of the configuration for the target port flags for a single AAS command received by the data storage system for a single ITL:

1. The target port flags for the single I1-T1-L1 are updated.
2. The target port flags for I1-T1-L* are updated. In other words, the target port flags for all LUNs visible over the single I1-T1 are updated.
3. The target port flags for I*-T1-L1. In other words, the target port flags for the single LUN L1 visible through T1 for all initiators of the particular host H1 including I1 are updated. As a further variation of case 3, the I* may refer to all initiators of more than the single host H1. For example I* may refer to all initiators of all hosts or a selected set of hosts (e.g., depending on whether such hosts may or may not require different target port flag settings. See discussion elsewhere herein regarding homogeneous and heterogeneous host environments).
4. The target port flags for I*-T1-L* are updated. In other words, the target port flags for all initiators of the host H1 including the initiator I1 for the single target port T1 for all LUNs exposed through T1 are updated. As a further variation of case 4, the I* may refer to all initiators of more than the single host H1 including I1. For example I* may refer to all initiators of all hosts or a selected set of hosts.
5. The target port flags for I*-T*-L1 are updated. In other words, the target port flags for all initiators of the host H1 (including I1) for all target ports of the data storage system through which the single LUN L1 is exposed are updated. As a further variation of case 5, the I* may refer to all initiators of more than the single host H1. For example I* may refer to all initiators of all hosts or a selected set of hosts.
6. The target port flags for I*-T*-L* are updated. In other words, the target port flags for all initiators of the host for all target ports of the data storage system (exposed to that set of initiators) for all exposed LUNs exposed through all such target ports are updated. In other words, case 6 for LUNs may relate to all LUNs in the data storage system. As a variation for case 6, there may be considered a case 7 whereby the LUNs denoted by L* may alternatively refer to all LUNs visible on the single target port T1 that received the AAS command. As a further variation for cases 6 and 7, the I* may refer to all initiators of more than the single host H1. For example I* may refer to all initiators of all hosts or a selected set of hosts.

The above-mentioned list of 6 items may generally be characterized as different scoping options or case options whereby particular ones may be referenced in following paragraphs such as in connection with subsequent illustrations and/or examples. For example, the above item number 2 may be referred to as scoping option or case option 2.

It should be noted that the particular target port configuration scope option selected for use in an embodiment (e.g., whereby a single AAS command received for a particular ITL may cause port flag changes for other ITLs) may vary with the particular environment. For illustration in connection with FIG. 5, only a single host is described. However, there may be multiple hosts which communicate with the data storage system. Some embodiments may be characterized as homogeneous with respect to the hosts whereby the hosts communicating with the data storage system have the same identifying information such as the same operating system and possibly other aspects which may affect target port flag settings. In such embodiments, target port configuration scope options may be selected in which target port flag settings of ITLs including initiator ports beyond those of the single host sending the AAS command may be affected. Alternatively, an embodiment may be characterized as heterogeneous with respect to the multiple hosts communicating with the data storage system whereby the hosts communicating with the data storage system have different identifying information such as different operating systems and/or possibly differ with respect to other aspects which may affect target port flag settings. In such embodiments, target port flags for ITLs of host H1 having operating system 1 may be required to have different settings than target port flags for ITLs of host H2 having operating system 2. In this case, a configuration scope option may be selected in which an AAS command received for an ITL for host H1 does not affect target port flag settings of ITLs for other hosts such as H2 (e.g., the AAS command may be limited to affecting only one or more ITLs of host H1).

It should be noted that the number of target port flag settings which may be stored on the data storage system may vary with embodiment such as, for example, being based on the supported scope of the configuration for the target port flags utilized and the possible level of granularity/ies at which target port flag settings may be independently specified. For example, if the embodiment supports specifying a different set of target port flag settings for each ITL, then a single set for each ITL may be stored. If the embodiment alternatively only supports an option such as option 4 above, then a lesser number of settings may be stored such as one per target port. This is described in more detail elsewhere herein, for example, such as in connection with FIG. 9.

In operation, the driver of the host 202 may be issuing multiple AAS commands over multiple discovered paths for the different exposed LUNs of the data storage system whereby a single AAS command may affect more than one set of target port flag settings for more than a single ITL. A first AAS command sent from the host to the data storage system over a first ITL may receive a response R5*b* indicating that a change to target port flag settings for the one or more affected ITLs (in accordance with a selected target port configuration scope) is needed and the data storage system may make any suitable changes in step S6. Assume for illustration purposes that the first AAS command results in changes to target port flag settings for the first LUN 1 over a first path I1-T1 (e.g., I1-T1-L1) and also a second LUN 2 exposed over the same path I1-T1 (e.g., I1-T1-L2). A second AAS command subsequently sent from the host to the data storage system over I1-T1-L2 may receive a response R5*a* indicating that no change to target port flag settings for the one or more affected ITLs is needed and the data storage system may return response R5*a*. In this manner, the first AAS command may result in changes to target port flag settings associated with multiple ITLs thereby causing subsequent AAS commands to return response R5*a* rather the R5*b*. During operation, the driver may perform processing associated with step S4 for each ITL discovered.

As described above, after the host receives an R5*b* message a first time indicating that a change to target port flags for target port T1 are needed, any subsequent AAS commands sent in connection with other ITLs including T1 may receive and R5*a* response. As an alternative, an embodiment may return R5b in response to such subsequent AAS commands as well as returning R5b in response to the first AAS command.

If the host receives only R5a responses to all AAS commands sent over multiple ITLs, then processing with techniques herein may stop at the end of phase 1. The host may continue with other typical processing. However, if the host receives one or more R5b responses in response to AAS commands sent over ITLs, then processing enters phase 2 and the host waits in step S7 until it receives all responses (either R5a or R5b) to all outstanding AAS commands. While the driver is waiting to receive such responses for any AAS commands, the driver may hold or queue all I/Os directed to any LUN over any ITL. Based on above, if the driver controlling the processing on the host 202 receives even a single R5b response, phase 2 is entered where the driver waits in step S7 until either a response R5a or R5b is received in response to all AAS commands sent of all ITLs.

It should be noted that processing performed on the data storage system in connection with step S5 (e.g., a determination as to whether current target port flag settings are OK or otherwise require modification) may be performed with respect to a selected target port flag configuration scope option. For example, assume case option 2 above is in effect (e.g., the target port flags for I1-T1-L* are updated where the target port flags for all LUNs visible over the single I1-T1 are updated). Also assume that two LUNs 1 and 2 (e.g., LUNs denoted as L1 and L2) are exposed over the single I1-T1. A first single AAS command may be received for I1-T1-L1 resulting in processing on the data storage system in step S5 to check both the target port configuration settings for I1-T1-L1 and I1-T1-L2 and possibly modify one or both of the target port flags for each of I1-T1-L1 and I1-T1-L2.

It should be noted that in connection with responses R5a and R5b as described above, such responses may include a good status and may also return additional information indicating either no changes to target port flags are needed (R5a) or changes to target port flags are needed (R5b). For example, in SCSI terms, the additional information may be encoded using one or more flags or conditions in sense data. Rather than include such an indication that a change or no change is needed with respect to target port flags in the response to the AAS command, an embodiment may alternatively just return a status of good or acknowledgement in response to the AAS command. Subsequently, the host may then issue another query command, such as a second AAQ command, and receive such additional information in response to the second query command whereby the additional information may be generally data indicating whether any changes to the target port flags are needed (e.g., as determined in accordance with the selected target port flag configuration scope option).

The data storage system may obtain information of which initiator ports are on which hosts for use in accordance with the selected target port flag configuration scope option in a variety of different ways that may vary with embodiment. For example, as described in more detail elsewhere herein, each AAS command sent from a host with respect to a particular ITL may identify the host such as by a host name or other unique host identifier. In this manner, the data storage system may group or associate initiators of the same host having the same host name or other unique host identifier included in the various AAS commands. More generally, the data storage system may obtain information regarding which initiators are included in a particular host using any suitable means supported in an embodiment.

Continuing with processing of FIG. 5 wherein, if at least one R5b response is received at the host, then in step S7, the driver waits until it has received responses to all AAS commands for any remaining ITLs. The driver may then perform processing which will trigger a rescan or rediscovery of all ITLs and associated information. Although the MP driver triggers the rescan or rediscovery in step S7, the actual rescan or rediscovery processing is performed in step S8 by the operating system.

In step S7, the driver may trigger or signal to the operating system to perform processing for rediscovery in step S8 in one or more ways that may vary with embodiment. For example, the driver such as the MP driver performing the processing on the host 202 of FIG. 5 may execute in kernel mode and may signal a user process on the host to make an appropriate operating system call from user space causing the rediscovery. As a second option, the MP driver may make a call directly into the operating system to perform the rediscovery if such a call is supported in an embodiment. As a third option, the rediscovery may be triggered by an out of band management command. As a fourth option, an embodiment may use a unit attention. A unit attention is a condition in the target requiring the initiator's attention. A unit attention (UA) condition in SCSI terms may be generally characterized as a way in which the data storage system notifies the host (or initiator thereof) about one or more particular conditions requiring attention. In accordance with the SCSI standard, an error return for a command may be used to signal the unit attention and sense data may be used to communicate the information that there is a unit attention condition and also provide more specific information regarding the particular unit attention condition. For example, if the MP driver receives an indication that target port flags for an ITL require modification, the MP driver waits in step S7 until the cycle of host registration is complete whereby responses have been received for all AAS commands issued on all ITLs. Subsequently, the MP driver may issue a command, such as a read capacity command, a read command to read block 0 of a LUN, or another command that will, in response, cause the host to receive information indicating a unit attention condition from the data storage system. When the host receives the response indicating the unit attention from the data storage system, the operating system of the host responds by triggering a rediscovery of all ITLs. The particular unit attention condition selected for use with techniques herein may be selected because it is known that such a unit attention condition causes an operating system to respond by performing a rescan/rediscovery.

As part of processing for rediscovery, various information is communicated between the host and the data storage system such as related to all ITLs and different processing may be performed depending on the particular target port flag settings which have changed. Thus, such processing may be repeated once any necessary target port flag changes have been completed. Since discovery processing is generally expensive (e.g., time consuming and may use a lot of resources), it is desirable to avoid performing unnecessary multiple rediscoveries such as may be triggered by the host receiving multiple unit attention conditions from the data storage system. It should be noted that an embodiment may also have functionality to selectively perform discovery processing for less than all ITLs at levels of granularity that may also vary. For example, an embodiment may include support to perform discovery processing for all ITLs as noted above, for all I-Ts for a particular single LUN, and the like. In this manner where supported, an embodiment may track which ITLs have target port flags updated and selectively repeat discovery processing for such ITLs in step S8.

As a result of performing step S8, the MP driver is again invoked thereby repeating processing on the host performed by the driver such as related to host registration (e.g. repeating host side processing steps S2 and S4). However, in this instance, R5a NO CHANGE is expected to be received in response to all AAS commands issued with respect to all ITLs in step S4 thereby indicating no change to any target port flags is needed for any ITLs.

Figure 6:
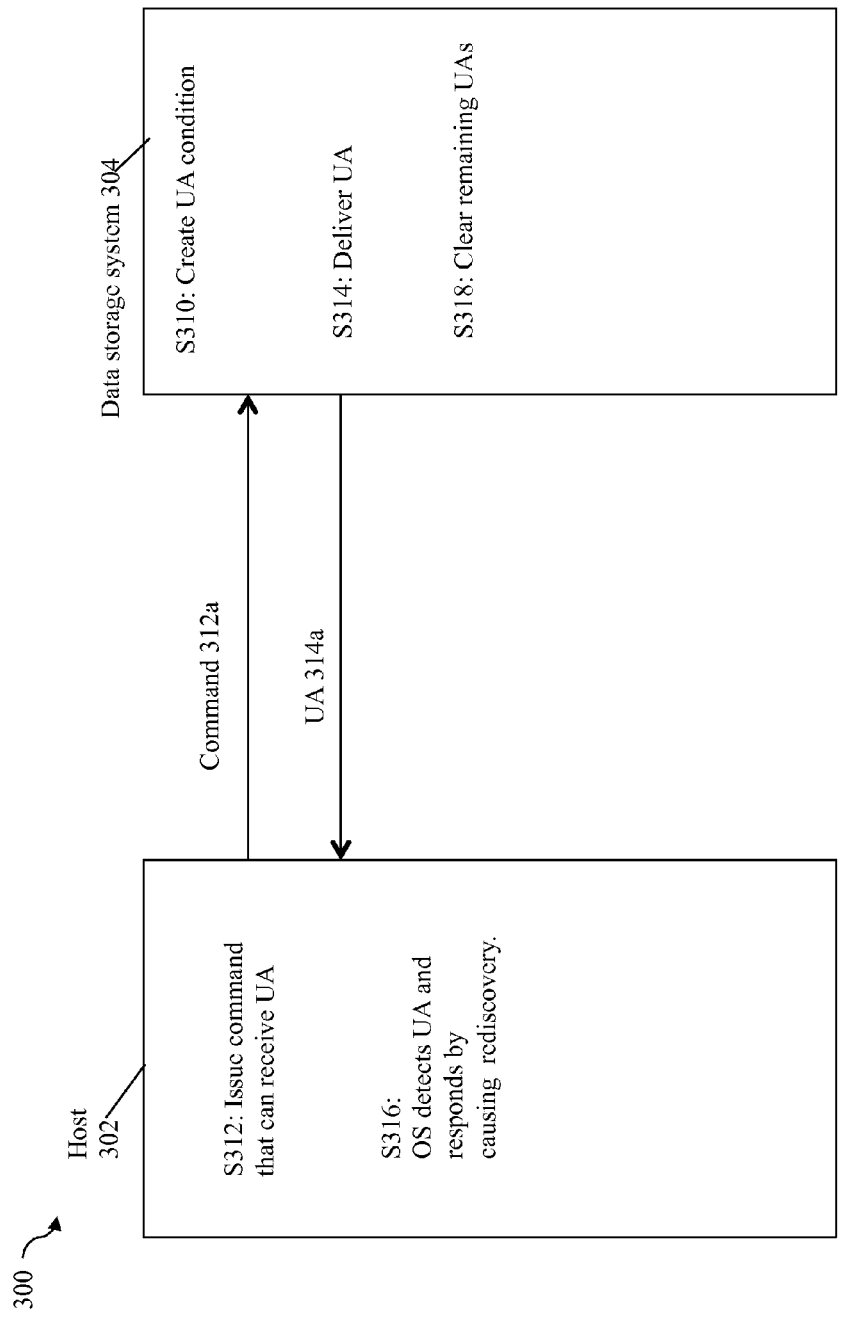

With reference to FIG. 6, what will now be described in more detail is use of a unit attention condition mentioned above in connection with triggering a rescan or rediscovery in step S8. Consistent with discussion above, a UA is the way in which the data storage system 304 notifies the host 302 (or initiator thereof) about one or more particular conditions requiring attention. In step S310, the data storage system 304 may track the occurrence of one or more events requiring attention or notification to the host. The host issues S312 command 312a to the data storage system. Upon receipt of the command 312a from the host, the data storage system delivers an indication of the UA condition (S314) in a response 314a returned to the host. It should be noted that the data storage system may not perform processing of the requested command 312a and may rather just return response 314a indicating the UA condition.

The response sent to the host in 314a may indicate the UA and may also include additional information providing details regarding the particular UA. On the host side, as illustrated by S316, the received UA denotes a special condition which the host knows requires special processing. Typically, after performing such special processing, the host may reissue the original command to which the data storage responded with a unit attention condition. As known to those skilled in the art in accordance with the SCSI standard, UA may not be a valid returned condition for all SCSI commands issued from the host. For example, in an embodiment operating in accordance with the SCSI standard, a UA condition may not be returned to an initiator in response to the AAQ command, AAS command, and others. However, a UA may be received in response to other commands such as I/O commands (e.g., read capacity, read block zero of a LUN) and others. In this manner, the host may issue one of the commands for which a UA may be returned by the data storage system in order to trigger rediscovery by the operating system of the host.

It should be noted that S312 on the host may be performed by the driver, such as the MP driver described above. The rediscovery in S316 may be performed by the host operating system.

Once the UA is delivered (S314) to the host 302, the data storage system 304 may then clear (S318) any remaining UAs established in response to modifying target port flags for an ITL that includes an initiator of that same host 302. Step S318 is described in more detail below.

As mentioned above, the UA may be characterized as a general mechanism to provide notification to the host regarding many different types of conditions requiring attention. The response returned to the host may indicate the UA and may also provide additional information as noted above regarding the details as to why the UA condition was established. For example, one or more fields of the response sent in 314a indicting the UA may include additional information regarding particular details as to why the UA was established. It should be noted that a host may not perform rediscovery in response to generally receiving any/all UAs. Rather, the host may also look at the additional information regarding the particular details as to why the UA was established in order to determine whether to perform rediscovery or take some other course of action. In connection with techniques herein, the data storage system may create a UA condition responsive to changing target port flags for a particular ITL and may include in the response 314a additional information denoting particular details for a UA which will cause the host operating system to perform a rediscovery. For example, the additional information regarding the particular conditions causing the UA may indicate an inquiry data change, a logical unit inventory change, and the like, which will cause the host operating system to perform rediscovery. In this manner, the data storage system may be characterized as establishing a particular UA in response to changing target port flags where the particular UA established denotes a UA condition known to cause the host operating system to perform rediscovery.

It should be noted that UA conditions may be established by the data storage system on multiple ITLs. For example, the data storage system may have modified target port flags for many different ITLs. In this case, UA conditions may be established for all such ITLs and the host may issue the command 312a (for which the UA 314a is returned to the host) from paths for any one of these ITLs. However, when the first such UA condition 314a is sent to the host, all UAs established on the data storage system due to the modification of target port flags for this particular host may be cleared. This is to avoid returning multiple UAs to the same host which would cause multiple rediscoveries when rediscovery only needs to be performed once even when multiple sets of target port flags for multiple ITLs have been modified. It should be noted that the foregoing description of performing rediscovery only once holds true since previous processing waited in step S7 for responses to all AAS commands.

In an embodiment in accordance with the SCSI standard, UA conditions may be established at a level of granularity of all I-Ts for a particular LUN. For example, even though target port flag settings may be modified for only a single ITL, a UA condition may be established on the data storage system in S310 for all ITs over which that LUN is exposed.

It should be noted that the possible ITLs for which a UA condition may be established in S310 and the possible remaining ITLs for which a UA condition may also cleared in S318 may be in accordance with the particular target port configuration scope option selected in an embodiment.

In some embodiments, when a UA condition is delivered for an ITL of a particular host H1, the remaining UA conditions cleared in S318 may have a scope, for example, of any UAs for any initiators of the same host H1. Described elsewhere herein are exemplary techniques by which the data storage system may obtain information specifying which initiator ports are included in each particular host. Such information may be used, for example, in determining which initiator ports and ITLs for such initiators may have pending UAs cleared in S318.

It should be noted that the particular UAs cleared in S318 may also vary with the scope at which the host performs discovery. For example, described elsewhere herein, the host may perform discovery processing for all ITLs or for a finer level of granularity. The scope at which UAs may be cleared in step S318 may be in accordance with, or limited by, the scope at which the host performs rediscovery or rescan (such as in step S8 of FIG. 5 and in S316 of FIG. 6). If the discovery processing of the host is performed for all ITLs of the host, the data storage system in S318 may clear pending UAs at a host level for the single host, or less than all pending UAs for the entire host. In a similar manner, if the discovery processing of the host is performed per initiator, the UAs cleared in S318 are limited to those of ITLs of the single initiator to which the UA is delivered in S314. The foregoing information regarding the scope of the host rediscovery and the scope at which UAs are cleared in S318 may be established and made known to the host and data storage system in any suitable manner (e.g., encoded in the code executed on the host and data storage system, established/defined in a configuration file, exchanged using one or more commands and associated information, and the like).

Figure 7:
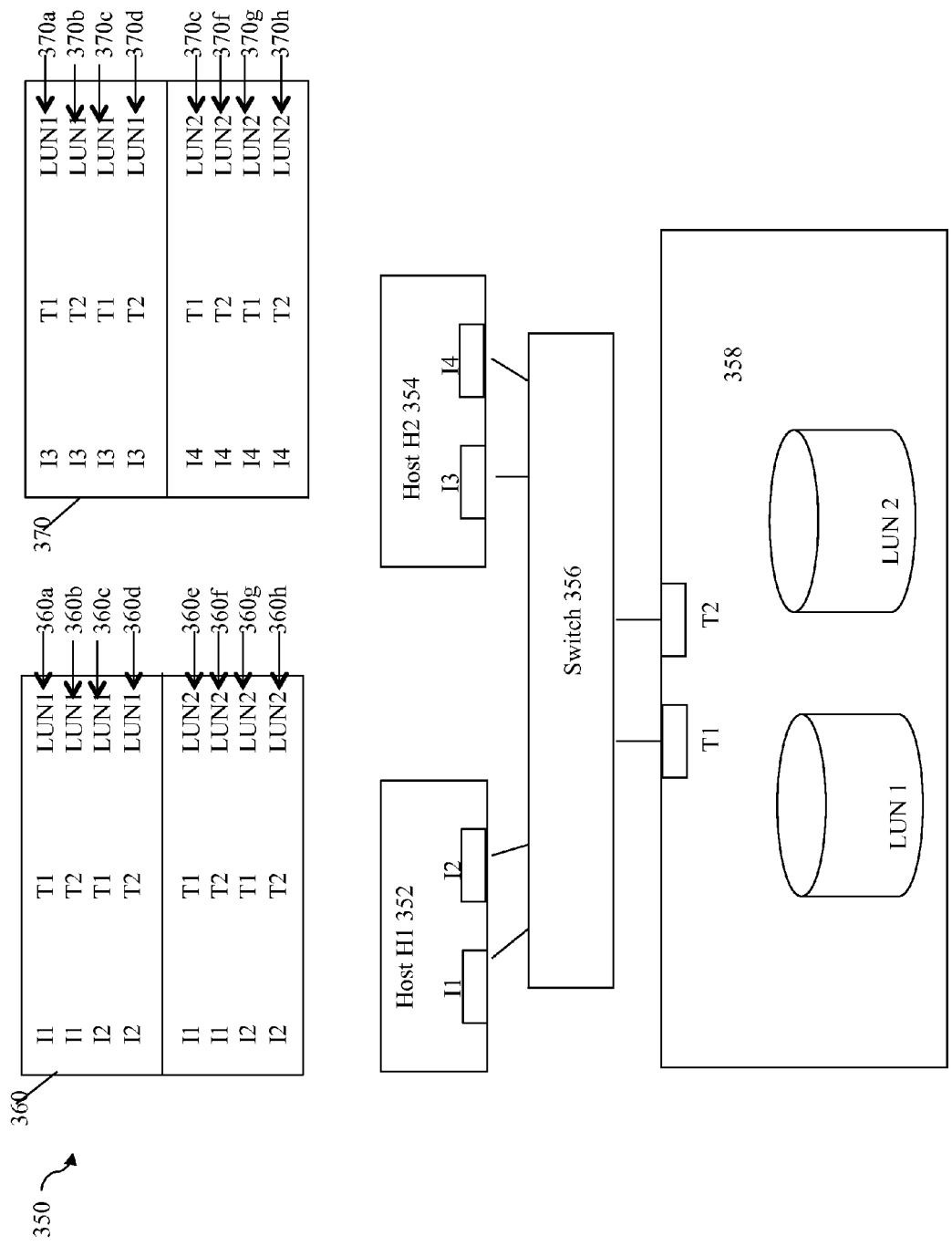
FIG. 7 is an example of a system used in connection with illustrating unit attention condition establishing and clearing as may be performed in an embodiment in accordance with techniques herein.

Referring to FIG. 7, what will now be described is an example illustrating use of techniques herein in connection with setting and clearing UAs. The example 350 includes hosts 352, 354, switch 356 and data storage system 358. Host H1 352 includes initiators I1 and I2. Host H2 354 includes initiators I3 and I4. Data storage system 358 includes target ports T1 and T2 and LUN1 and LUN2. Element 360 lists all ITLs for host H1 352. Element 370 lists all ITLs for host H2 354. For this example, assume the hosts H1 and H2 each perform rescan or rediscovery (e.g., such as in connection with S316 of FIG. 6 and S8 of FIG. 5) for all ITLs of the host, or at the per host level. Also, in accordance with the foregoing rescan or rediscovery scope of the host, the data storage system clears pending UAs at the host level once a first UA is sent to the host such as described in connection with FIG. 6.

In accordance with processing described herein, presume that host H1 has already sent AAQ commands to the data storage system for each ITL in 360 and has received responses to the AAQ commands indicating that the data storage system supports host registration. Host H1 also sends a first AAS command with identifying information for ITL I1-T1-L1 (LUN 1) as represented by 360a. Assume the scope of target port configuration changes is all ITs for a single LUN from host H1 so that if a change is made to a target port flag in connection with the first AAS command, the data storage system also automatically modifies, if needed, target port flag settings for all paths (e.g., ITs) from host H1 exposing LUN1. In other words, the target port flags modified correspond to the 4 ITLs as represented by the first 4 lines (360a-d) of table 360 thereby indicating that the same target port flag settings are used for ITLs 360a-d. The data storage system may establish UAs for these 4 ITLs 360a-d. Host H1 may also send additional AAS commands down the other 3 remaining paths from H1 to LUN1 as denoted by 360b-d. As described herein, in one embodiment, responses received for such 3 AAS commands may indicate no change is needed to target port flag settings (e.g. R5a returned as illustrated in FIG. 5). As also described herein as a variation, responses received for such 3 AAS commands may alternatively indicate that a change is needed to target port flag settings. (e.g., R5b returned as illustrated in FIG. 5).

Host H1 sends a fifth AAS command with identifying information for ITL I1-T1-L2 (LUN 2) 360e. As noted above, the scope of target port configuration changes is per LUN so that if a change is made to a target port flag in connection with the fifth AAS command, the data storage system also automatically modifies, if needed, target port flag settings for all paths (e.g., ITs) from host H1 exposing LUN2. In other words, the target port flags modified correspond to the 4 ITLs as represented by the last 4 lines (360e-h) of table 360. The data storage system may establish UAs for these 4 ITLs (360e-h). Host H1 also sends additional AAS commands down the other 3 remaining paths from H1 to LUN2 s denoted by 360f-h. As described herein, in one embodiment, responses received for such 3 AAS commands may indicate no change is needed to target port flag settings (e.g. R5a returned as illustrated in FIG. 5). As also described herein as a variation, responses received for such 3 AAS commands may alternatively indicate that a change is needed to target port flag settings. (e.g., R5b returned as illustrated in FIG. 5).

Host H2 354 may similarly issue AAS commands as described herein. For purposes of illustration, assume that no changes are required for target port flags for ITLs of Host 2 as noted in table 370.

With reference back to FIG. 5, host H1 352 waits in step S7 for all responses to all 8 AAS commands and host H1 receives multiple responses R5b indicating target port flag modification are needed. Host H1 may trigger a rescan or rediscovery using the UA condition technique as illustrated in FIG. 6. Host H1 may send a command 312a, such as a read command to read block 0 of a LUN, to data storage system 358 whereby the read command may be sent over any of the 8 paths denoted in table 360. For illustration, assume the host H1 sends the command 312a to LUN 1 over path I1-T1 (e.g., I1-T1-L1). In response to receiving the read command from H1, the data storage system 358 delivers a response to host H1 indicating a UA and including additional information with details about the particular UA condition which causes the host H1 to trigger a rescan or rediscovery. The data storage system 358 clears the UA associated with I1-T1-L1 and also clears all remaining 7 pending UAs for host H1 (e.g., all remaining UAs pending for the last 7 ITLs of table 360).

Figure 8:
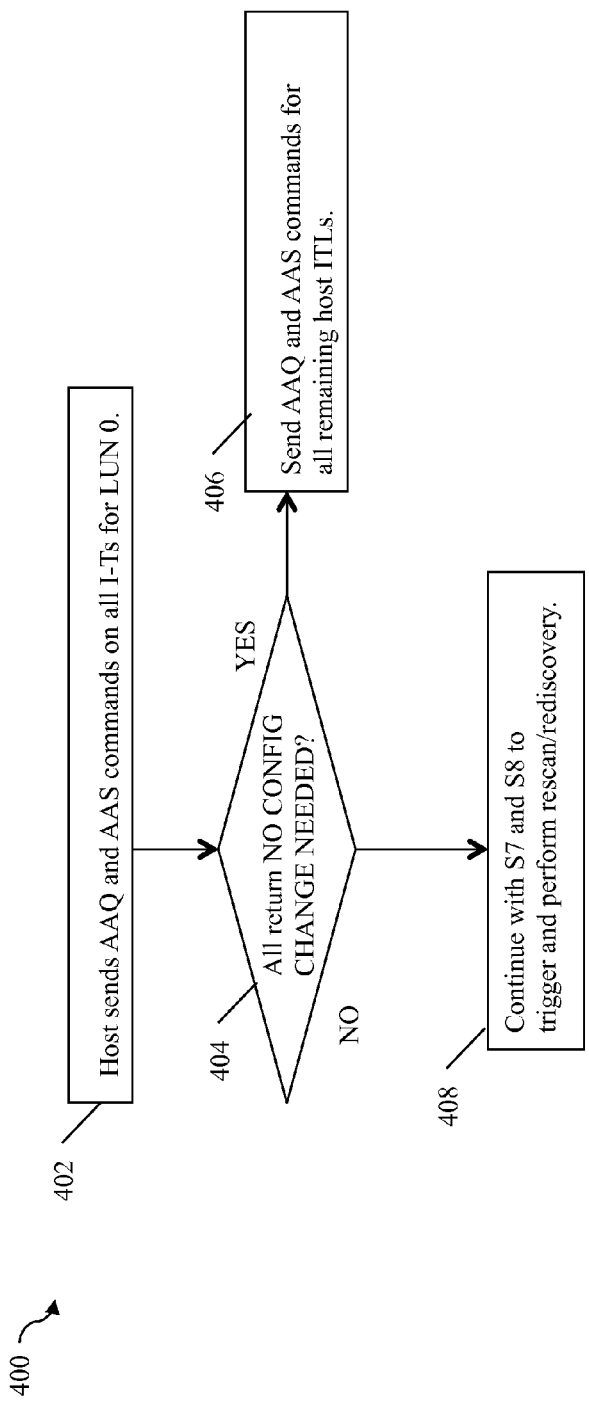
FIGS. 8, 10, 11 and 12 are flowcharts of processing steps that may be performed in an embodiment in accordance with techniques herein.

Depending on the particular embodiment and host operating system, it may not be desirable or preferred to send the non-I/O commands such as the AAS and AAQ commands herein to all LUNs unless target port settings are properly configured. However, independent of whether the target port settings are properly configured for a host operating system, proper behavior may be obtained when such non-I/O commands are directed to only LUN 0, or another well-known LUN (as specified in the SCSI standards), even without having target port settings properly configured. In such cases, the driver performing techniques herein may be further adapted to perform processing as will now be described with reference to FIG. 8. In such an embodiment, it should be noted that the scope of target port configuration changes on the data storage system may be one of the "all LUNs options" (e.g., scoping or case options 2, 4, 6 and 7) described herein affecting all LUNs visible on one or more target ports of the data storage system.

In step 402, the host sends AAQ and AAS commands on all ITs for LUN 0. At step 404, the host determines whether it has received responses for all AAS commands sent in step 402 thereby indicating that no target port flag configuration change is needed (e.g., all result in returning R5a). If step 404 evaluates to yes thereby indicating no target port change configuration is needed, control proceeds to step 406 where the AAQ and AAS commands may be sent for all remaining host ITLs. If step 404 evaluates to no, control proceeds to step 408 to continue with processing to trigger and perform a rescan as described herein, for example, with reference to S7 and S8 of FIG. 5. It should be noted that rescan will again cause processing described herein for host registration (e.g., as in FIG. 5) to be performed again. However, as result of this latter host registration performed in connection with the rescan, the results are expected to be that the host receives only R5a responses indicating NO CHANGE needed in response to all AAS commands.

It should be noted that an embodiment may also not require step 406 to be performed if the embodiment provides for implicitly registering all remaining ITLs for all remaining LUNs other than LUN 0 as a result of successfully completing registration with no changes needed in connection with commands issued in step 402. For example, step 402 may include sending AAQ and AAS commands for I1-T1-L0 and then receiving a response R5a to the AAS command indicating no configuration changes are needed. Assuming there are 2 other LUNs—LUN1 and LUN 2—the foregoing may also implicitly register LUN 1 and LUN 2 for I1-T1. In other words, step 406 may or may not be required to be performed for registration purposes depending on the particular embodiment.

An embodiment may select default target port flag settings which generally are most likely to result in not requiring further modification or rather seek to minimize expected modification. (e.g., those settings most likely to result in returning no configuration change needed as illustrated by R5a of FIG. 5). For example, of all possible operating systems that may reside on the host, there may only be a single first operating system requiring a first target port flag to be set or enabled. All other operating systems that may reside on a host connected to the data storage system may alternatively require the first target port flag to be disabled or off. In this case, a default setting of disabled for the first target port flag may be specified because the disabled setting is most likely to result in not requiring modification for the majority of possible host operating systems. In this manner, the entire set of target port flags may be similarly configured to have a default configuration that collectively is expected to minimize any required subsequent modification. The default configuration may correspond to those settings most likely to result in returning no configuration change needed to any target port setting.

The target port flags settings of a target port may affect one or more aspects of the target port's behavior and/or data storage system behavior in connection with a received command at the target port (e.g., behavior of the data storage system when executing the command and/or behavior of the data storage system in response to an error or other condition occurring as a result of command execution). For example, the target port flag setting may affect behavior of data storage system or target port firmware code execution, target port hardware settings and/or processing performed in connection with executing a command received on a particular ITL, processing performed in response to an error occurring during execution of a command received on a particular ITL, behavior of the data storage system in response to conditions arising on the data storage system (e.g. which may not be related to execution of any received command at the target port) and the like. As further examples and as will be described in more detail below, settings of target port flags may affect, for example, whether certain commands received at the target port are recognized or result in a response that is an error condition, may affect the format of the response to a control or non-I/O command, may affect one or more of the scopes described herein such as related to modification of target port flags, setting and/or clearing UAs on the data storage system, and the like.

What will now be described are examples of some target port flags that may be included in an embodiment in accordance with techniques herein.

1. Common SN flag (C flag)—controls naming behavior in connection with responding to a received SCSI INQUIRY command that accesses VPD page 83(hex) and affects how the LUNs and other entities on the data storage system are named and constructed. For example, the setting of this flag may affect algorithmic construction of a LUN name that uniquely identifies a particular LUN. There are host dependencies as to how names such as LUN names are constructed as may vary and are indicated by this flag setting.

2. SCSI 3 interface-(SC flag) controls what options are supported for error handling. If this flag is enabled, it indicates support for special processing of SCSI commands having the NACA (Normal Auto Contingent Allegiance) bit set to a value of one (NACA=1) in the command control byte affecting behavior in response to an error condition occurring while performing the command.

As known in the art, ACA (Auto Contingent Allegiance) is a SCSI error handling mechanism. Some SCSI commands may include a NACA control bit which, if set, affects how the data storage system handles error recovery. If this target port flag is set/enabled, the data storage system may recognize or pay attention to the NACA bit setting in received commands should an error occur when processing the command. Otherwise, if this target port flag is not set, the NACA bit in received commands at the target port may not affect error handling should an error occur in connection with processing the command. Thus, this setting may be used to control whether the target port provides special error handling support for commands having the NACA bit set.

For example, the data storage system may report an error condition to the host in connection with a SCSI command received at the target port where the command has the NACA bit set and the SC3 target port flag is enabled. The host may invoke error recovery code responsive to receiving the error condition to assist, for example, in obtaining additional information about the error condition. As such, a target port flag may be used to control whether the data storage system may only process commands issued by the host in error recovery once the error condition has been sent to the host. This special mode of limited command processing by the data storage system focusing on error recovery-related commands may continue until the host communicates to the data storage system that the error recovery processing is completed such as by clearing the error condition. It should be noted that there are also robustness advantages to not establishing an ACA condition for hosts that don't use ACA error handling, as such a host is unable to clear the error condition, resulting in remaining in a current state of limited command processing if a command is mistakenly sent with the NACA bit set to one and an error occurs.

3. SCSI primary commands—(SPC-2 flag) This flag setting affects behavior of some INQUIRY command and page settings. For example, this flag setting may affect information returned for these commands.

It should be noted that the SPC-2 flag may be generalized to represent an example of a flag setting affecting data storage system behavior and/or information returned such as in connection with commands where such behavior and/or information may vary with different versions of a standard, such as the SCSI SPC standard, including the commands. For example, the host driver may be written in accordance with different versions of the SCSI standard thereby affecting, for example, expected returned information from the data storage system. For a first command in accordance with a first version of the standard, first information may be expected as returned from the data storage system in response to the first command being issued from the host. For the first command in accordance with a second different version of the standard, second information (at least partially different from the first information) may be expected as returned from the data storage system in response to the first command being issued from the host. Thus, the particular setting to a flag such as SPC-2 may vary information and other processing performed by the data storage system.

4. OS2007 (OS07 flag)—Controls handling regarding UA conditions for particular SCSI commands such as inquiry, report LUNs, and capacity changes as well as mandatory support for a LUN 0 on every port. For example, this target port flag controls the scope at which a UA, or more generally a condition, is established and cleared on the data storage system with respect to different ITLs. If set, it indicates that there will always be a LUN 0 exposed through this port.

5. Disable queue reset on UA (D flag)-Controls whether the data storage system aborts all commands on a LUN when it reports a particular type of UA. Consistent with discussion elsewhere herein, some hosts require this behavior on multi-port devices.

6. Volume Set Addressing (V flag)—Controls the addressing mode to use for LUNs (e.g., affecting the technique used determine the logical unit number used to uniquely identify and address a logical unit). For example, peripheral device addressing may be the default when the V bit is disabled. Otherwise, if enabled, a different technique referred to as volume set addressing (VSA) may be used. As known in the art, VSA uses virtual busses, targets, and LUNs to increase greatly the number of LUNs that can be addressed on a target port. Volume Set Addressing is supported for the HP-UX operating system.

7. Avoid Reset Broadcast (ARB flag)—Controls the scope at which UA conditions are set. This controls whether the data storage system propagates UA conditions across all directors/target ports following a host reset condition. For example, the host may send a reset to the data storage system for a LUN at a target port. The setting of this flag controls whether the resulting UA is established on just the single target port or with respect to all target ports through which the LUN is exposed.

8. FA AS400 (AS4 flag)—Controls whether the data storage system recognizes and processes AS400 specific commands. AS400 is an IBM server system. Setting this bit on or enabled causes the data storage system to recognize and process such commands. If the target port flag is disabled or off, any received commands at this target port of the AS400 specific commands are not recognized and result in an error condition.

9. Open VMS (OVMS flag)—controls behavior related to particular command support for OpenVMS operating system. For example, in a manner similar to that described above for the AS4 target port flag, if the OVMS flag is enabled, certain commands specific to hosts running the OpenVMS operating system are recognized.

It should be noted that depending on the functionality provided and affected by each of the target port flag settings modified, an embodiment may use one or more target port flags which, even if modified, may not require the host to perform rediscovery/rescan in step S8 of FIG. 5. For example, the D flag is an example of one such target port flag since modifying the D flag may not result in changes to information obtained by the host from the data storage system as part of discovery processing.

As a further exemplary illustration, an embodiment may specify default target port flag settings whereby the following flags are enabled: Common SN (C flag), SCSI 3 interface—(SC flag), SCSI primary control—(SPC-2 flag), OS2007 (OS07 flag), and the following flags are disabled: Disable queue reset on UA (D flag), Volume Set Addressing (V flag), Avoid Reset Broadcast (ARB flag), FA AS400 (AS4 flag), and Open VMS (OVMS flag).

With these default target port flag settings, following are some examples of target port flag settings requiring modification when the host identifying information indicates that the host is executing a particular operating system. The LINUX operating system on a host may require that target port flags have the D flag enabled. The HP-UX operating system may require the V flag to be enabled. The HP Tru64 operating system on a host may require the OVMS flag to be enabled and the SC3 flag disabled. The HP OpenVMS operating system on a host may require the OVMS flag to be enabled. IBM's AS400 operating system may require the V flag and AS4 flags to be enabled and the SC3 and OS07 flags to be disabled. Thus, in accordance with techniques herein, target port flag settings may be automatically modified if the host includes one of the foregoing, or possibly other, operating system requiring target port flag settings different from the defaults noted above.

It should be noted that in accordance with description herein, reference is made to using an established LUN such as LUN 0 which is guaranteed to exist and be supported for all target ports for use with techniques herein. More generally, LUN 0 or another well-known LUN may be supported for particular commands issued to any target port. Well known logical units allow an application client to issue requests to receive specific information relating to a SCSI target without having to discover the LUN before issuing such requests.

Figure 9:
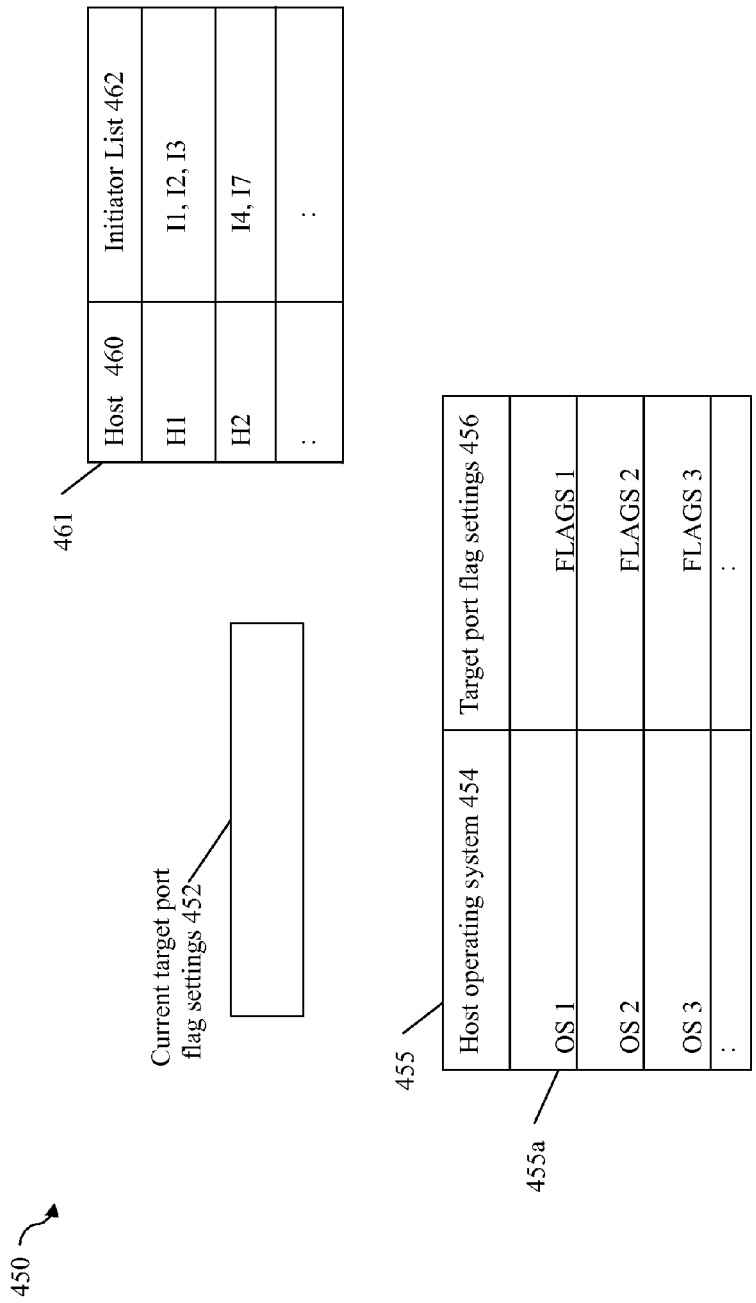
FIG. 9 is an example of information that may be used by the data storage system in an embodiment in accordance with techniques herein.

Referring to FIG. 9, shown is an example of information that may be maintained on the data storage system for use with techniques herein. The example 450 includes current target port flag settings 452 which may include a current target port flag configuration for each possible ITL. Initially, an embodiment may set the target port flag settings of 452 for each port to a set of default values as described above. Using techniques described herein, one or more current target port flag settings (each specifying current target port settings for a different ITL) may be automatically updated as needed.

It should be noted that the number of instances of target port flag settings 452 which may be stored on the data storage system may vary with embodiment such as based on the scope of the configuration change for the target port flags. For example, one embodiment may use target port flag configuration scope option 4 as described elsewhere herein where modifying target port flags of a single target port T1 affects the target port flags for all ITs including T1 for all LUNs across all hosts. For example, with reference back to FIG. 7 in such an embodiment, a single set of target port flag settings may be maintained for T1 and used for any/all ITLs including T1 across both hosts H1 and H2 (e.g., 360a, c, e, g and 370a, c, e, g), and a single set of target port flags may be maintained for T2 and used for any/all ITLs including T2 across both hosts H1 and H2 (e.g., 360b, d, f, h and 370b, d, f, h). In this case, the data storage system need only store two sets of target port flags which are used for the particular ITLs as just described.

The data storage system may also maintain a table 455 of target port flag settings required for particular host operating systems. Table 455 includes a first column 454 identifying a host operating system and a second column 456 identifying target port flag settings. Each row of table 455 may identify required target port flag settings in column 456 for an operating system identified in column 454 of the same row. For example, row 455a specifies that host operating system OS1 requires target port flag settings FLAGS1. Each single set of target port flag settings such as in 452 and 456 may be a bit vector denoting the appropriate flag settings. The data storage system may use information in 455 in performing step S5 of FIG. 5 to determine whether any changes to the current target port settings for an ITL are needed in accordance with the required target port flag settings for a particular host operating system. For example, information sent from the host in connection with the AAS command identifies the host operating system. A search may be performed of table 450 to determine which row identifies an operating system in column 454 matching the operating system as communicated using the AAS command. For the matching row, the settings in column 456 may be compared to the current target port flag settings for a particular ITL. If there are any differences, the current target port flag settings for the ITL may be modified to the settings in column 456 of the matching row of table 455. It should be noted that a particular host operating system instance in column 455 may be identified by an operating system name alone, or in combination with, one or more particular versions. In this manner, a first row in table 455 may identify a first operating system OS1 and one or more versions, and a second row of table 455 may also identify OS1 but with a different one or more versions than those included in the first row.

Element 461 may be a table created by the data storage system to identify which one or more initiators are included in each host. As described herein, the table 461 may be constructed, for example, using information communicated by the various hosts in connection with the AAS and AAQ commands with host registration.

Figure 10:
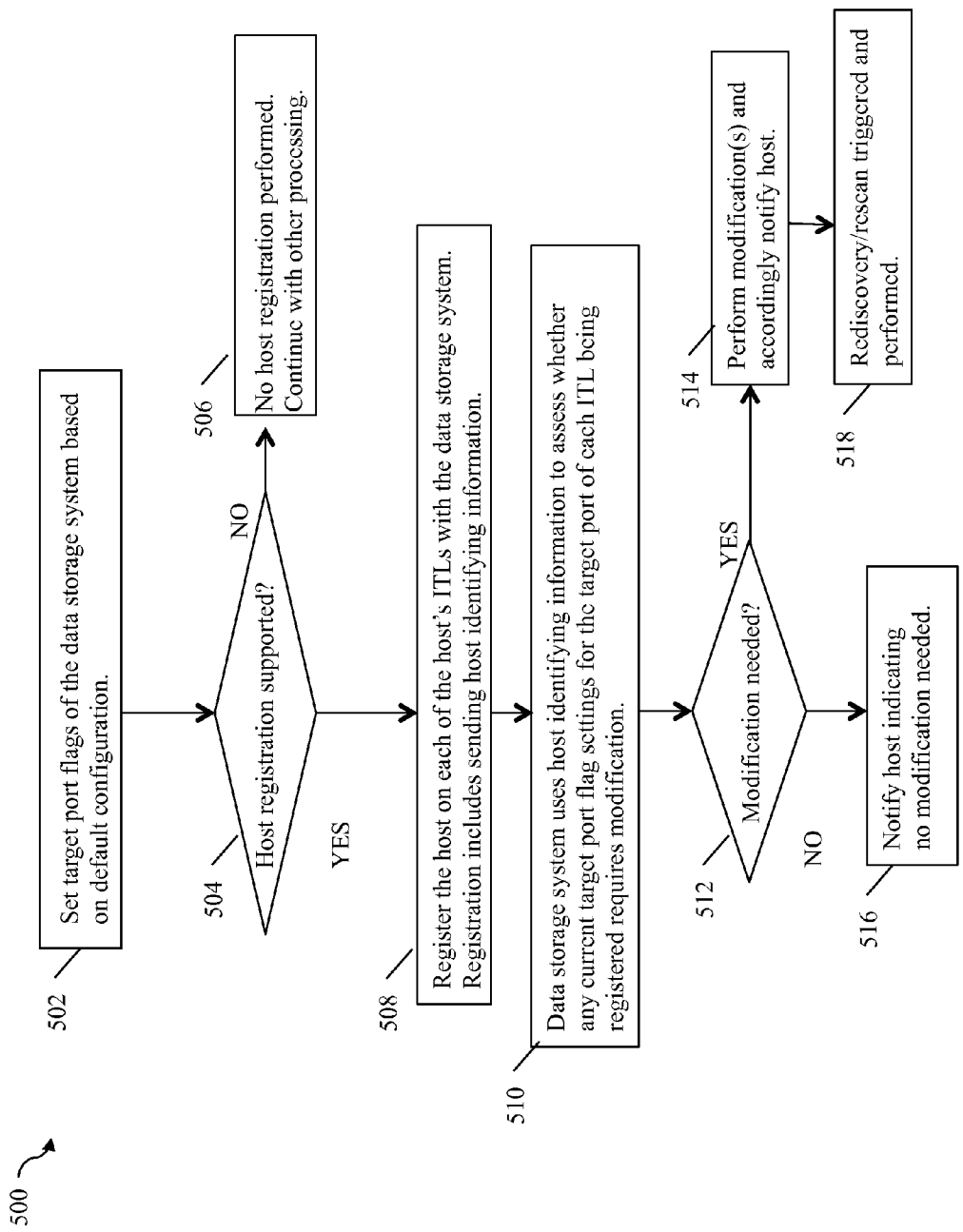

Referring to FIG. 10, shown is a flowchart 500 summarizing processing that may be performed in an embodiment in accordance with techniques herein. It should be noted that the flowchart 500 summarizes processing as may be performed for a single host and a single data storage system. More generally, the processing of flowchart 500 may be repeated for multiple hosts and/or multiple data storage systems.

At step 502, target port flags on the data storage system may be set based on default configuration settings. At step 504, the host determines whether the data storage system supports host registration. If not, control proceeds to step 506 where no host registration is performed and host processing may continue with other subsequent processing. If step 504 evaluates to yes, control proceeds to step 508 to perform host registration processing. Step 508 may include processing to register the host on each of the host's ITLs with the data storage system whereby as part of host registration the host sends host identifying information to the data storage system. At step 510, the data storage system uses the host identifying information to assess whether any current target port flag settings for the target port of each ITL being registered for the host requires modification. At step 512, a decision is made in accordance with step 510 as to whether any target port flags of the data storage system require modification. If step 512 evaluates to yes, control proceeds to step 514 where the necessary target port flag modifications are performed and the host is accordingly notified that modifications to the flags are needed. At step 518, the rediscovery/rescan is triggered and performed. If step 512 evaluates to no, control proceeds to step 516 to notify the host that no modifications to target port flags are needed.

Figure 11:
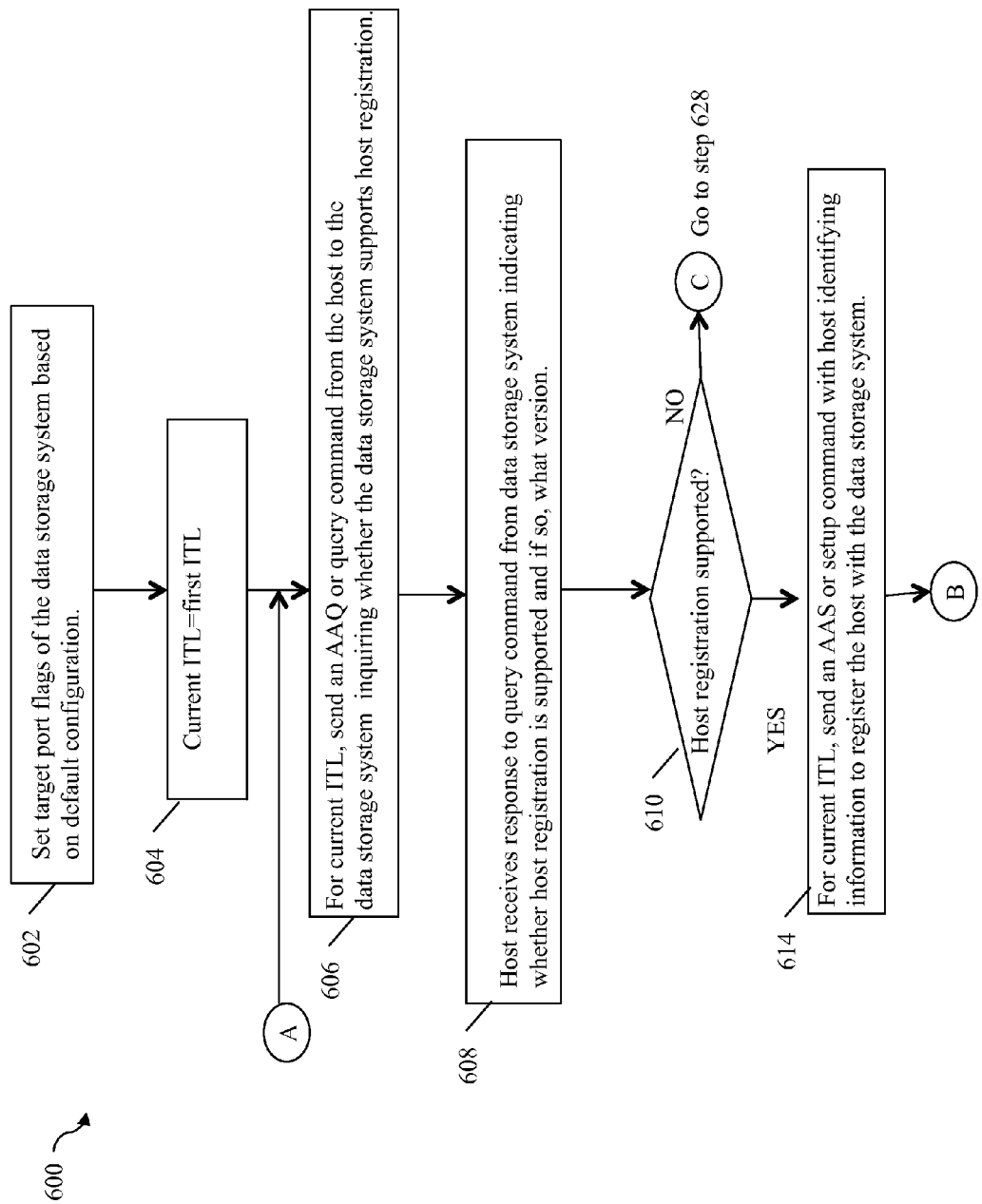
Figure 12:
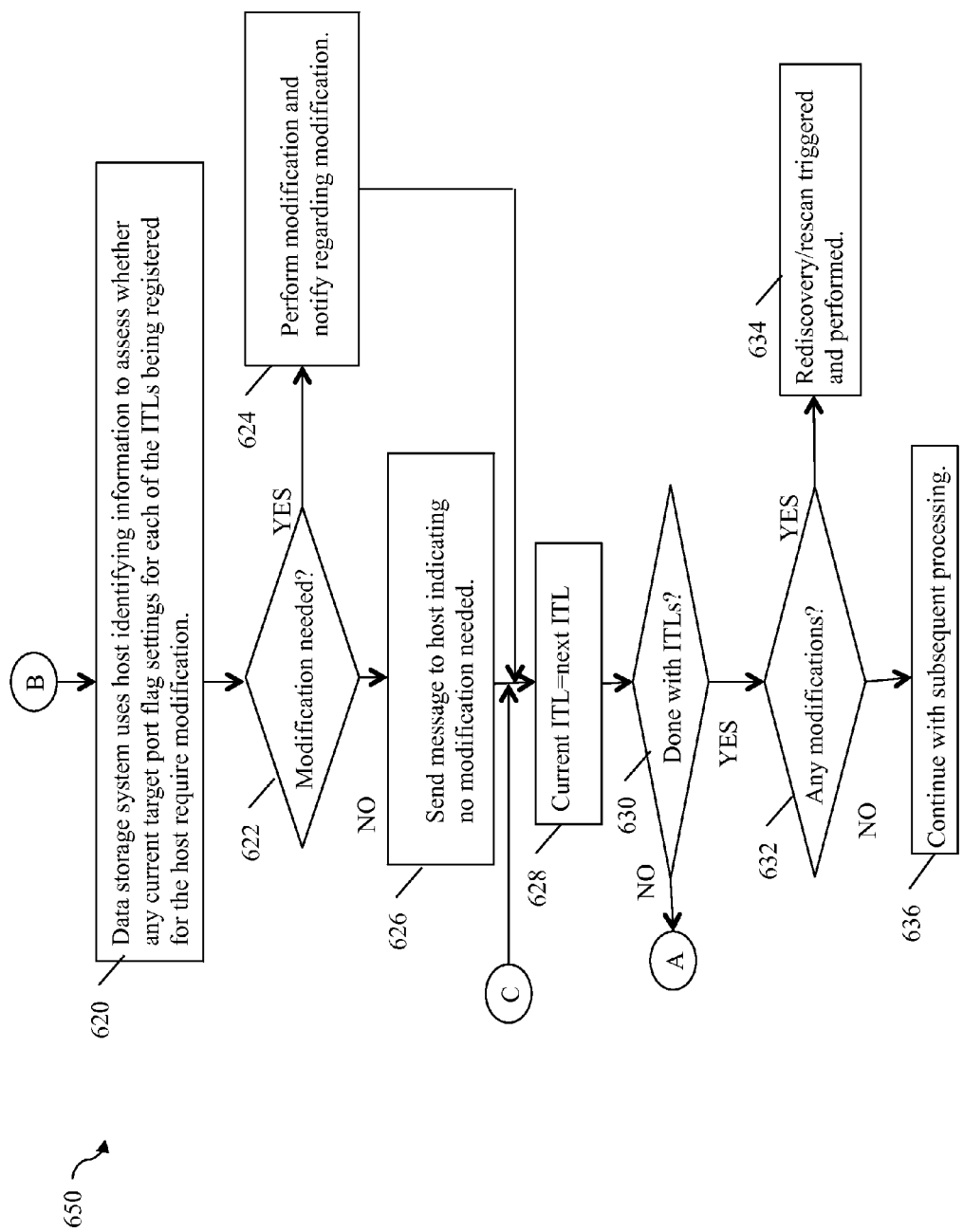

Referring to FIGS. 11 and 12, shown are flowcharts 600, 650 providing further detail of the processing steps described in the flowchart 500. At step 602, the target port flags of the data storage system target ports are set based on a default configuration as described in connection with step 502. At step 604, current ITL is assigned the first ITL for which registration of the host is performed. At step 606, for the current ITL, the host sends an AAQ or query command to the data storage system inquiring whether the data storage system supports host registration. At step 608, the host receives a response to the query command from the data storage system indicating whether host registration is supported and if so, what version. At step 610, the host determines, based on the response received in step 608, whether the data storage system supports host registration. If step 610 evaluates to no, control proceeds to step 628. It should be noted that the host may iterate through all its ITLs (with respect to all its initiators) since each ITL may connect to a different data storage system. In this manner, a host may receive different responses to AAQ commands from different data storage systems. If step 610 evaluates to yes, control proceeds to step 614 where, for the current ITL, the host sends an AAS or setup command including host identifying information to register the host with the data storage system. At step 620, the data storage system uses the host identifying information to assess whether any current target port flag settings for each of the ITLs being registered for the host require modification. At step 622 a determination is made as to whether any target port flag modifications are needed. If step 622 evaluates to yes, control proceeds to step 624 to perform the target port flag modification and accordingly notify the host that modifications are needed. Control proceeds to step 628. If step 622 evaluates to no, control proceeds to step 626 to send a message from the data storage system to the host indicating that no target port flag modification is needed. Control proceeds to step 628 where current ITL is assigned the next ITL of the host. At step 630, a determination is made as to whether all the host ITLs have been processed. If step 630 evaluates to no, control proceeds to step 606. If step 630 evaluates to yes, control proceeds to step 632 where the host determines whether any target port flag modifications have been performed. If so, control proceeds to step 634 where rediscovery/rescan is triggered and performed by the host. If step 632 evaluates to no, control proceeds to 636 to continue with subsequent processing.

As described herein, processing on the host-side such as with reference to FIG. 5 may be performed by a driver of the host, such as the MP driver. Processing on the data storage system side may be performed by individual front end adapters, such as HAs of FIG. 3, of the data storage system.

Referring to FIG. 13, shown is an example 1000 of information that may be included in a command data block of an AAQ command in an embodiment in accordance with techniques herein. The exemplary AAQ command may include a command or operation code 1003 for the particular AAQ command, a LUN 1004, reserved field 1006, a database ID (identifier) 1008, an operational qualifier 1010, a key 1012, buffer length 1014 and a control byte 1016. In connection with one embodiment, the particular specified LUN in 1004 may not matter in connection with performing the AAQ command but may be required to be included in a command in accordance with a standard such as the SCSI standard. In other words, generally, the SCSI command is directed to a particular LUN as identified in the command in accordance with the standard. In this case, the particular LUN, although included in the command block, may not be used in connection with performing the requested query. The fields 1006 and 1012 may be reserved and be required to be zero. The combination of database ID 1008 and operational qualifier 101 may identify the particular query performed. Database ID 1008 identifies the type of object to be queried such as, for example, the physical storage system, initiator, and the like, in accordance with the particular object types supported in an embodiment. In this case, the database ID 1008 may identify the proper object type to return information regarding supported features of the data storage system including the particular version of host registration, if any, supported by the data storage system. The particular operational qualifier 1010 may vary for each type of database ID. The buffer length field 1014 contains the maximum length, in bytes, of the data that may be returned to the initiator in response to the AAQ command. If the requested information returned from the data storage system will not fit in the length provided, the data storage system may return an indication of how much space is required rather than returning the requested data itself. Note that since data is actually returned in response to the AAQ command, this particular situation where the length 1014 identifies a size that is smaller than the requested data may only return a status of a check condition if the buffer length 1014 does not indicate sufficient space to allow the data storage system to return information denoting how much space is required.

As known in the art in connection with SCSI standards, CHECK CONDITION is one possible status that may be returned or indicated by the data storage system in response to a request by the host, or more generally, an initiator, to perform a command. Generally, a status of check condition may indicate that the requested command was not successfully executed (e.g., an error occurred when executing the command or that the command was not executed).

The control byte 1016 may be used for a variety of different purposes affecting aspects of operation of the requested command. For example, the control byte 1016 may include vendor-specific information, specify settings affecting execution on the data storage system such as how a command is handled when successful, on failure or error, and the like.

Figure 14:
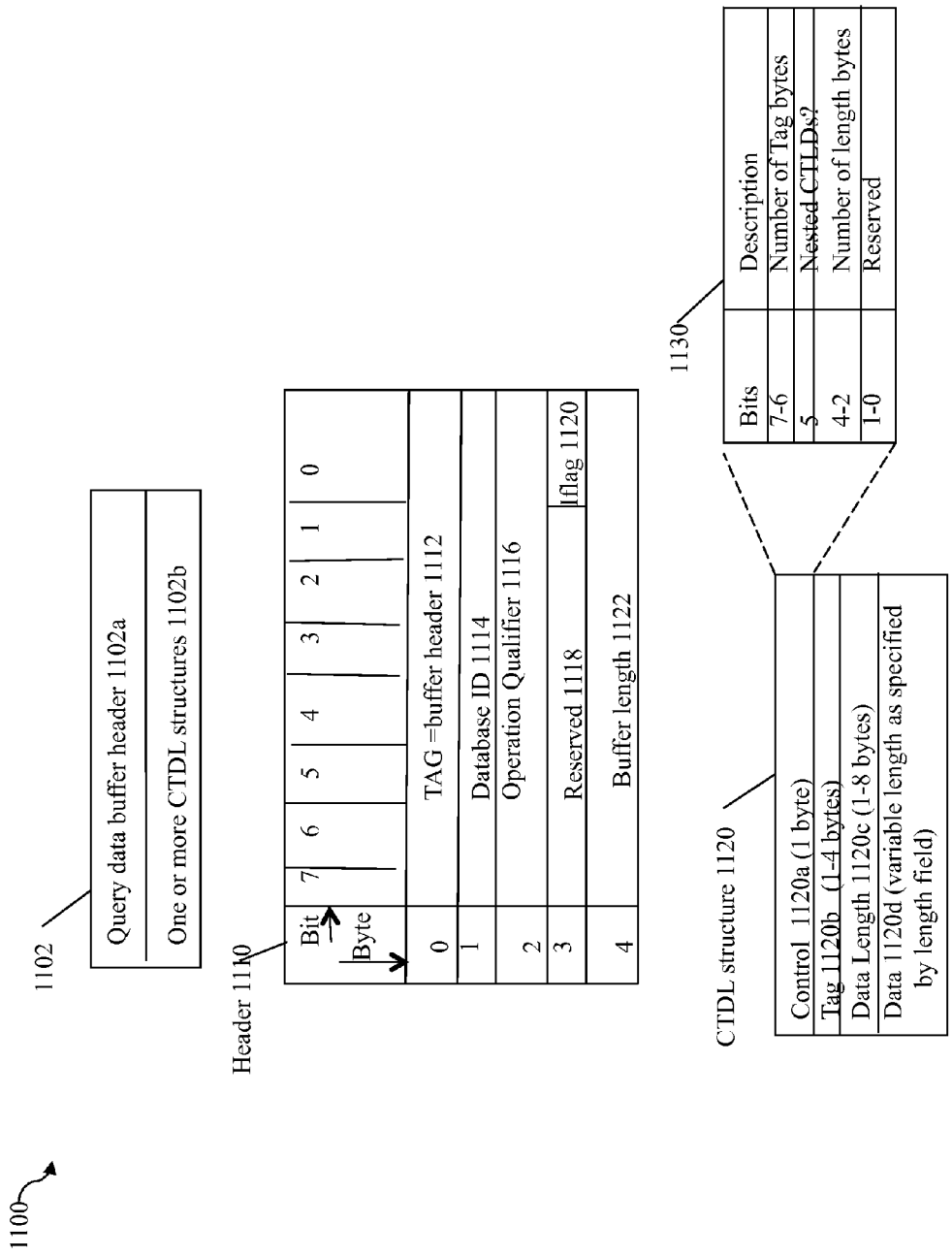

Referring to FIG. 14, shown is an example illustrating in more detail a format of the information that may be returned by the data storage system to the host such as in response to the AAQ command. The information 1102 returned to the host in response to the AAQ command may include a query data buffer header 1102a and a string of one or more CTLD (control tag length data) structures 1102b including the requested data in response to the AAQ command for the particular database ID 1008 and operational qualifier 1010 of the AAQ command described above. As described elsewhere herein, one item returned to the host by the data storage system in response to the AAQ command is whether the data storage system supports host registration and, if so, returns the particular version of the host registration the data storage system is able to support. It should be noted that the particular version of the host registration supported may vary with particular sets of information that may be sent from the host to the data storage system with an AAS command. For example, one version of host registration may include support for identifying information related to the host operating system having a first format. A second version of host registration may include support for identifying information related to the host operating system and may also allow the host to specify information regarding the HBA or initiator port hardware and/or firmware version (where the first version does not support sending information in the AAS command for host registration related to the HBA or initiator port hardware and/or firmware version). A third version of the host registration may support sending information in the AAS command for host registration for the operating system but such information may have a format different than that of the first version. In this manner, a response to the AAQ command may denote whether the data storage system supports host registration and, if so, what one or more versions of host registration are supported by the data storage system.

Information returned to the host in response to the AAQ command indicating whether the data storage system supports host registration, and if so, what host registration version may be included in one of the CTLD structures of 1102b along with optionally other information in response to the AAQ command. As described below, each CTLD structure of 1102b may include a tag type describing the type of information returned. A tag value may be defined, such as TAG_HOST_REG_VERSION, denoting that the CTLD structure includes data identifying the host registration version supported. It should be noted that different predefined numeric values may be used as tag values whereby each such tag value may denote a different tag type. In this manner, a tag value may be included in a predefined set of possible tag values denoting the tag type of TAG_HOST_REG_VERSION. TAG_HOST_REG_VERSION may be characterized as a symbolic representation of the number denoting the particular tag type for a CTLD structure. If a structure of 1102b returned in response to the AAQ command does not include a structure with a tag denoting TAG_HOST_REG_VERSION, this indicates that the data storage system does not support the host registration features. If a structure of 1102b returned in response to the AAQ command does include a structure with a tag denoting TAG_HOST_REG_VERSION, the structure further identifies the particular version supported. For example, the structure may include information in the form of a string identifying the supported host registration version (e.g., version number may be "major.minor" starting at "1.0" where major denotes the major version number and minor denotes a minor version number).

Element 1110 provides further details of an exemplary format of the query data buffer header 1102a that may be used in an embodiment in accordance with techniques herein. The header 1110 may include a tag field 1112 identifying this as a header, database ID 1114, operational qualifier 1116, reserved field 1118, Iflag field 1120 and buffer length field 1122. Fields 1114 and 1116 may echo the corresponding information as included in a received AAQ command for which this data is now being returned. Reserved field 1118 may be unused and required to be 0. The IFlag field 1120 may be 0 if the requested data is returned or 1, if insufficient space/size was specified in the buffer length field (e.g., 1004) of the command data block to contain the requested data. If IFlag is 1, none of the requested data is returned and rather the buffer length field 1122 specifies the size or amount of storage required to hold the complete set of return requested data. In this manner, the original AAQ may be reissued with a buffer (e.g. with a length as denoted in 1014) having a sufficient size as denoted by 1122. As described above, if the incomplete Message Flag (Iflag 1120) is 0, the buffer length field 1122 contains the actual length, in bytes, of the data returned (including the length of the Query Data Buffer Header itself). When full query buffer data is returned, the buffer length 1122 indicated in the header 1110 includes an integral number of complete CTLD structures. If Iflag=1, field 1122 contains the buffer length that is required to hold the requested data (including the length of the Query Data Buffer Header itself. In this case, there is no data in the buffer beyond the Buffer Length field 1122 itself.

Element 1120 provides further details regarding one format of a CTLD structure that may be used in an embodiment in accordance with techniques herein. The CTLD structure has a self-describing data format that allows for variable length data to be passed between the storage system and the host. A typical data stream may include one or more CTLD structures 1102b where such structures may be concatenated together. In addition, data fields may contain further nested CTLD structures (as indicated by the nested CTLD control bit described below). The CTLD structure may include a control field 1120a which may be one byte, a tag field 1120b which may be 1 to 4 bytes) a data length field 1120c which may be 1 to 8 bytes, and data 1120d having a variable length as specified by length field 1120c. With reference to the host registration version, a single instance of 1120 may describe the particular version supported and included in the data field 1120d a string identifying the particular supported host registration version. It should be noted that the length field 1120c is a value indicating the actual number of bytes in the data field 1120d of this structure 1120. A length value of zero in 1120c indicates there is no data field 1120d. The data field 1120d may be required to have exactly the number of bytes specified in the length field 1120c or an error may be indicated. The data field 1120d may contain nested CTLD structures as indicated by bit 5 of the control field 1120a described below.

Element 1130 provides further details regarding one format of the control field 1120a of the CTLD structure that may be used in an embodiment in accordance with techniques herein. As illustrated by 1130, the following bits of the control field 1120a of the CTLD structure may encode information as follows:

Bits 7-6 may denote the number of bytes occupied by the tag field 1120b, minus 1;

Bit 5 may indicate whether the data field 1120d includes further nested CTLD structures (e.g., if bit 5=0, it denotes that the data field 1120d is raw data with no nested CTLD structures, and if bit 5=1, it may denote that the data field 1120d includes further nested CTLD structures)

Bits 4-2 may indicate the number of bytes occupied by the length field 1120c, minus 1.

Bits 1-0 may be reserved and set to zero.

It should be noted that a nested grouping of CTLD structures may be used to communicate multiple items of information that may pertain to a same higher more general category of information. For example, an embodiment may provide support where the data storage system may support multiple host registration versions. In one embodiment, one CTLD structure for each of the supported versions may be included in a larger nested CTLD structure.

Referring to FIG. 15, shown is an example 1200 of information that may be included in a command data block of an AAS command in an embodiment in accordance with techniques herein. The exemplary AAS command may include a command or operation code 1203 for the particular AAS command, LUN field 1204, reserved field 1206 (which may be zero), a database ID (identifier) 1208 identifying the initiator object type, an operational qualifier field 1210 (which may be zero in this example), a payload buffer length field 1214 and a control byte 1216 which is reserved and may be zero. The length 1214 may denote the actual length, such as in bytes, of the data accompanying the command data block 1202. For an AAS command, the data following the command data block 1202 may be a set of CTLDs such as described in connection with the example 1100. In other words, an embodiment may send information to the data storage system from the host with the AAS command having a format and structure similar to the format and structure of data returned from the data storage system to the host in response to the AAQ command described above. Information that may be sent to the data storage system by the host with an AAS command may be in the form of a string or sequence of CTLDs. The information sent to the data storage system may include a CTLD identifying information about the host such as the host operating system (e.g., the LINUX operating system, the Windows NT operating system by Microsoft Corporation, the HP UX Unix operating system by Hewlett Packard Corporation, the OS/400 operating system by IBM Corporation, and the like), the particular operating system revision or version number, information regarding the driver used in performing techniques herein such as regarding the MP driver (e.g. driver name, version number, build number), host identifier such as a generated unique host identifier, host or initiator IP address, initiator type, interface options, and the like.

As described herein with reference back to FIG. 4, the MP driver 106 or other driver issuing the AAQ and AAS commands from the host may send an AAQ and AAS command down each path it discovers with respect to each exposed LUN in order to register on that path for each such LUN with the data storage system. The host may send an AAQ command to the data storage system down each path for each exposed LUN to inquire whether the data storage system supports host registration and, if so, what version. If supported, the driver may then send an AAS command down each path it discovers with respect to each exposed LUN in order to register that path for each such LUN with the data storage system. If host registration is not supported as indicated by the response to the AAQ command received at the host with respect to a particular path with respect to a particular LUN, the driver does not send any AAS commands down the particular path directed to that LUN to the data storage system. As described above, an AAQ and AAS commands for host registration may be sent by the host for each ITL combination. On the data storage system side, the particular I-T associated with the AAQ/AAS command may be determined as the initiator that sent the commands and the target port at which the command is received. The particular LUN may be identified in a field of the command.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of automatically configuring target port settings comprising:
    initializing a set of target port settings of a target port of a data storage system in accordance with a first target port setting configuration;
    determining whether the data storage system supports host registration;
    responsive to determining that said data storage system supports host registration, performing first processing including:
        registering a first host with the data storage system, wherein said registering includes sending first information from the first host to the data storage system, said first information being sent from an initiator port of the first host to the target port;
        determining, using the first information, whether the set of target port settings of the target port require modification for use by the first host; and
        responsive to determining that the set of target port settings of the target port require modification, modifying the set of target port settings in accordance with the first information, wherein said determining whether the data storage system supports host registration include sending a query command from the initiator port to the target port and receiving a first response from the data storage system indicating whether host registration is supported.

2. The method of claim 1, wherein the first information includes identifying information identifying one or more aspects of the first host affecting target port setting settings.

3. A method of automatically configuring target port settings comprising:

initializing a set of target port settings of a target port of a data storage system in accordance with a first target port setting configuration;
determining whether the data storage system supports host registration;
responsive to determining that said data storage system supports host registration, performing first processing including:
registering a first host with the data storage system, wherein said registering includes sending first information from the first host to the data storage system, said first information being sent from an initiator port of the first host to the target port;
determining, using the first information, whether the set of target port settings of the target port require modification for use by the first host; and
responsive to determining that the set of target port settings of the target port require modification, modifying the set of target port settings in accordance with the first information, wherein the first information includes identifying information identifying one or more aspects of the first host affecting target port setting settings and wherein the identifying information includes information related to any of host operating system, host hardware, initiator port hardware, initiator port firmware, additional host software besides host operating system, and software included in a runtime I/O stack used in connection with sending I/Os from the first host to the data storage system.

4. A method of automatically configuring target port settings comprising:
initializing a set of target port settings of a target port of a data storage system in accordance with a first target port setting configuration;
determining whether the data storage system supports host registration;
responsive to determining that said data storage system supports host registration, performing first processing including:
registering a first host with the data storage system, wherein said registering includes sending first information from the first host to the data storage system, said first information being sent from an initiator port of the first host to the target port;
determining, using the first information, whether the set of target port settings of the target port require modification for use by the first host; and
responsive to determining that the set of target port settings of the target port require modification, modifying the set of target port settings in accordance with the first information, and wherein said first processing further comprises:
notifying the first host as to whether the set of target port settings of the target port requires modification and thereby indicating to the first host that performing discovery processing and registering the first host with the data storage system is needed;
responsive to the first host receiving notification that the set of target port settings of the target port require modification, triggering the first host to perform second processing including discovery processing and reregistering the first host with the data storage system, wherein said reregistering includes the data storage system notifying the first host that no modifications to the set of target port settings is needed.

5. The method of claim 1, wherein the first response indicates host registration on the data storage system is supported and the first response includes information identifying one or more host registration versions that are supported.

6. A method of automatically configuring target port settings comprising:
initializing a set of target port settings of a target port of a data storage system in accordance with a first target port setting configuration;
determining whether the data storage system supports host registration;
responsive to determining that said data storage system supports host registration, performing first processing including:
registering a first host with the data storage system, wherein said registering includes sending first information from the first host to the data storage system, said first information being sent from an initiator port of the first host to the target port;
determining, using the first information, whether the set of target port settings of the target port require modification for use by the first host; and
responsive to determining that the set of target port settings of the target port require modification, modifying the set of target port settings in accordance with the first information, wherein registering the first host with the data storage system includes registering the first host on a plurality of paths between the first host and the data storage system with respect to one or more storage devices exposed to the first host over the plurality of paths.

7. The method of claim 6, wherein the data storage system performs target port setting modifications in accordance with a scoping target port setting configuration option.

8. The method of claim 7, wherein a first set of target port settings of a first target port of the data storage system is used in connection with commands received at the first target port, and the scoping target port setting configuration option is any of:
the first set of target port settings of the first target port is used in connection with commands received at the first target port for a single initiator and a single storage device exposed through the first target port,
the first set of target port settings of the first target port is used in connection with commands received at the first target port for a single initiator and all storage devices exposed through the first target port,
the first set of target port settings of the first target port is used in connection with commands received at the first target port for a plurality of initiator ports and a single storage device exposed through the first target port,
the first set of target port settings of the first target port is used in connection with commands received at the first target port for a plurality of initiator ports and all storage devices exposed through the first target port,
the first set of target port settings of the first target port is used in connection with commands received at a plurality of target ports of the data storage system for a plurality of initiator ports and a single storage device exposed through the first target port,
the first set of target port settings of the first target port is used in connection with commands received at a plurality of target ports of the data storage system for a plurality of initiator ports and all storage devices of the data storage system, and
the first set of target port settings of the first target port is used in connection with commands received at a plurality of target ports of the data storage system for a plurality of initiator ports and all storage devices exposed through the first target port.

9. The method of claim 4, wherein said second processing is triggered by any of: a call by a driver of the first host into an operating system of the first host, a driver executing in kernel space invoking a process executing in user space whereby the process performs an operating system call, a management command, and a notification received by the host from the data storage system whereby the notification results in an operating system of the first host performing the second processing and wherein the notification is sent to the first host in response to a command sent to the data storage system.

10. The method of claim 3, wherein the identifying information is sent from the first host to the data storage system in a setup command.

11. The method of claim 10, wherein registering the first host includes sending the identifying information in a setup command over a plurality of paths between the first host and the data storage system.

12. The method of claim 10, wherein registering the first host includes sending a plurality of setup commands from the host to the data storage system, each of the plurality of setup commands corresponding to a unique combination of an initiator port of the first host, a target port of the data storage system, and a storage device exposed through the target port.

13. The method of claim 1, wherein the first response indicates that host registration is supported and wherein the first host includes a driver that performs said sending the query command and said receiving the first response and said driver performing second processing including:
responsive to receiving the first response, sending a setup command including the first information from the initiator port to the target port;
receiving a second response from the data storage system indicating that the set of target port settings require modification;
performing processing to trigger an operating system of the first host to perform third processing including discovery processing and reregistering the first host with the data storage system, wherein said reregistering includes the data storage system notifying the first host that no modifications to the set of target port settings is needed.

14. The method of claim 13, wherein, when the first host issues an I/O operation to the data storage system, the driver is included in a runtime I/O stack of the first host used in connection with issuing the I/O operation to the data storage system.

15. The method of claim 14, wherein the runtime I/O stack includes a plurality of software layers comprising an application layer, a file system and the driver below the file system in the runtime I/O stack.

16. A method of automatically configuring target port settings comprising:
initializing a set of target port settings of a target port of a data storage system in accordance with a first target port setting configuration;
determining whether the data storage system supports host registration;
responsive to determining that said data storage system supports host registration, performing first processing including:
registering a first host with the data storage system, wherein said registering includes sending first information from the first host to the data storage system, said first information being sent from an initiator port of the first host to the target port;
determining, using the first information, whether the set of target port settings of the target port require modification for use by the first host; and
responsive to determining that the set of target port settings of the target port require modification, modifying the set of target port settings in accordance with the first information and wherein the set of target port settings includes one or more flags affecting any of the target port, the data storage system, processing performed by the data storage system in connection with a received command at the target port, target port firmware code execution, target port hardware settings, processing performed in response to an error occurring during execution of a command received at the target port, and behavior of the data storage system in response to conditions arising on the data storage system.

17. A method of automatically configuring target port settings comprising:
initializing a set of target port settings of a target port of a data storage system in accordance with a first target port setting configuration;
determining whether the data storage system supports host registration;
responsive to determining that said data storage system supports host registration, performing first processing including:
registering a first host with the data storage system, wherein said registering includes sending first information from the first host to the data storage system, said first information being sent from an initiator port of the first host to the target port;
determining, using the first information, whether the set of target port settings of the target port require modification for use by the first host; and
responsive to determining that the set of target port settings of the target port require modification, modifying the set of target port settings in accordance with the first information, and wherein responsive to modifying the set of target port settings, one or more conditions are established on the data storage system indicating that the data storage system needs to send a notification to the first host, and the method further comprising:
sending a command from the host to the data storage system;
responsive to receiving the command at the data storage system, sending a message from the data storage system to the host regarding one of the conditions established on the data storage system, wherein the data storage systems clears any remaining ones of said one or more conditions for first host; and
responsive to the host receiving the message regarding the one condition, performing second processing including discovery processing and reregistering the first host with the data storage system, wherein said reregistering includes the data storage system notifying the first host that no modifications to the set of target port settings is needed.

18. A non-transitory computer readable medium comprising code stored thereon for automatically configuring target port settings, the computer readable medium comprising code that, when executed, performs processing including:
initializing a set of target port settings of a target port of a data storage system in accordance with a first target port setting configuration;

determining whether the data storage system supports host registration;

responsive to determining that said data storage system supports host registration, performing first processing including:

registering a first host with the data storage system, wherein said registering includes sending first information from the first host to the data storage system, said first information being sent from an initiator port of the first host to the target port;

determining, using the first information, whether the set of target port settings of the target port require modification for use by the first host; and responsive to determining that the set of target port settings of the target port require modification, modifying the set of target port settings in accordance with the first information, wherein said determining whether the data storage system supports host registration includes sending a query command from the initiator port to the target port and receiving a first response from the data storage system indicating whether host registration is supported.

19. A system comprising:

a data storage system including a target port having a set of target port settings, the data storage system comprising a first memory including code stored therein that, when executed, performs processing comprising:

initializing a set of target port settings of a target port of a data storage system in accordance with a first target port setting configuration;

a host including an initiator port and a second memory including code stored therein that, when executed, performs processing comprising:

determining whether the data storage system supports host registration;

responsive to determining that the data storage system supports host registration, performing first processing, said first processing including:

registering the host with the data storage system, wherein said registering includes sending first information from the host to the data storage system, said first information being sent from the initiator port of the host to the target port; and wherein the first memory of the data storage system further comprising code stored therein that, when executed, performs processing including:

determining, using the first information, whether the set of target port settings of the target port require modification for use by the host; and responsive to determining that the set of target port settings of the target port require modification, modifying the set of target port settings in accordance with the first information, wherein said determining whether the data storage system supports host registration includes sending a query command from the initiator port to the target port and receiving a first response from the data storage system indicating whether host registration is supported.

* * * * *